(12) United States Patent
Taghipour

(10) Patent No.: US 11,566,643 B2
(45) Date of Patent: Jan. 31, 2023

(54) FLUID FLOW CONDUIT WITH FLOW-SHAPING ELEMENT

(71) Applicant: THE UNIVERSITY OF BRITISH COLUMBIA, Vancouver (CA)

(72) Inventor: Fariborz Taghipour, Burnaby (CA)

(73) Assignee: THE UNIVERSITY OF BRITISH COLUMBIA

( * ) Notice: Subject to any disclaimer, the term of this patent is extended or adjusted under 35 U.S.C. 154(b) by 317 days.

(21) Appl. No.: 16/650,109

(22) PCT Filed: Sep. 25, 2018

(86) PCT No.: PCT/CA2018/051209
§ 371 (c)(1),
(2) Date: Mar. 24, 2020

(87) PCT Pub. No.: WO2019/056135
PCT Pub. Date: Mar. 28, 2019

(65) Prior Publication Data
US 2020/0300278 A1  Sep. 24, 2020

Related U.S. Application Data

(60) Provisional application No. 62/563,060, filed on Sep. 25, 2017.

(51) Int. Cl.
*C02F 1/32* (2006.01)
*B01J 19/12* (2006.01)
(Continued)

(52) U.S. Cl.
CPC ............ *F15D 1/001* (2013.01); *B01J 19/006* (2013.01); *B01J 19/123* (2013.01); *B01J 19/127* (2013.01);
(Continued)

(58) Field of Classification Search
CPC ... F15D 1/001; F15D 1/02; F15D 1/04; C02F 1/32; C02F 1/325; C02F 2201/3222;
(Continued)

(56) References Cited

U.S. PATENT DOCUMENTS 2,801,133 A * 7/1957 Ridley .................... B05B 7/149
239/602
4,595,319 A * 6/1986 Cook ...................... F16L 57/06
285/179
(Continued)

*Primary Examiner* — Lessanework Seifu
(74) *Attorney, Agent, or Firm* — Kilpatrick Townsend & Stockton LLP

(57) ABSTRACT

A fluid flow conduit according to one embodiment comprises: a body comprising a channel-defining surface which defines a principal flow channel extending in a longitudinal direction, wherein the body defines an interior flow region comprising the principal flow channel; an inlet for introducing fluid into the interior flow region, the inlet shaped so that an average velocity of fluid entering the interior flow region from the inlet is oriented in an inlet flow direction non-parallel to the longitudinal direction; and an outlet for conveying fluid out of the principal flow channel, the outlet spaced apart from the inlet in the longitudinal direction such that fluid that passes from the inlet to the outlet passes through at least a portion of the principal flow channel; wherein the fluid flow conduit defines a recess in the interior flow region and facing the inlet.

28 Claims, 19 Drawing Sheets

(51) Int. Cl.
*F15D 1/00* (2006.01)
*B01J 19/00* (2006.01)
*B01J 19/24* (2006.01)
*F15D 1/02* (2006.01)
*F28F 13/06* (2006.01)

(52) U.S. Cl.
CPC ............... *B01J 19/24* (2013.01); *C02F 1/325* (2013.01); *F15D 1/02* (2013.01); *F28F 13/06* (2013.01); *B01J 2219/0869* (2013.01); *B01J 2219/0877* (2013.01); *B01J 2219/1203* (2013.01); *C02F 2201/3222* (2013.01); *C02F 2201/3227* (2013.01); *C02F 2303/04* (2013.01)

(58) Field of Classification Search
CPC .......... C02F 2201/3227; C02F 2303/04; B01J 19/123; B01J 19/127; B01J 19/006; B01J 19/2415; B01J 19/24; B01J 2219/0869; B01J 2219/0877; B01J 2219/1203; F28F 13/06

See application file for complete search history.

(56) References Cited

U.S. PATENT DOCUMENTS

| | | | | |
|---|---|---|---|---|
| 4,606,556 | A * | 8/1986 | Metzger | ................... F16L 57/06 285/179 |
| 9,874,301 | B2 * | 1/2018 | Eisner | ................... F16L 55/041 |
| 10,882,764 | B2 * | 1/2021 | Mochizuki | ................ C02F 1/32 |

* cited by examiner

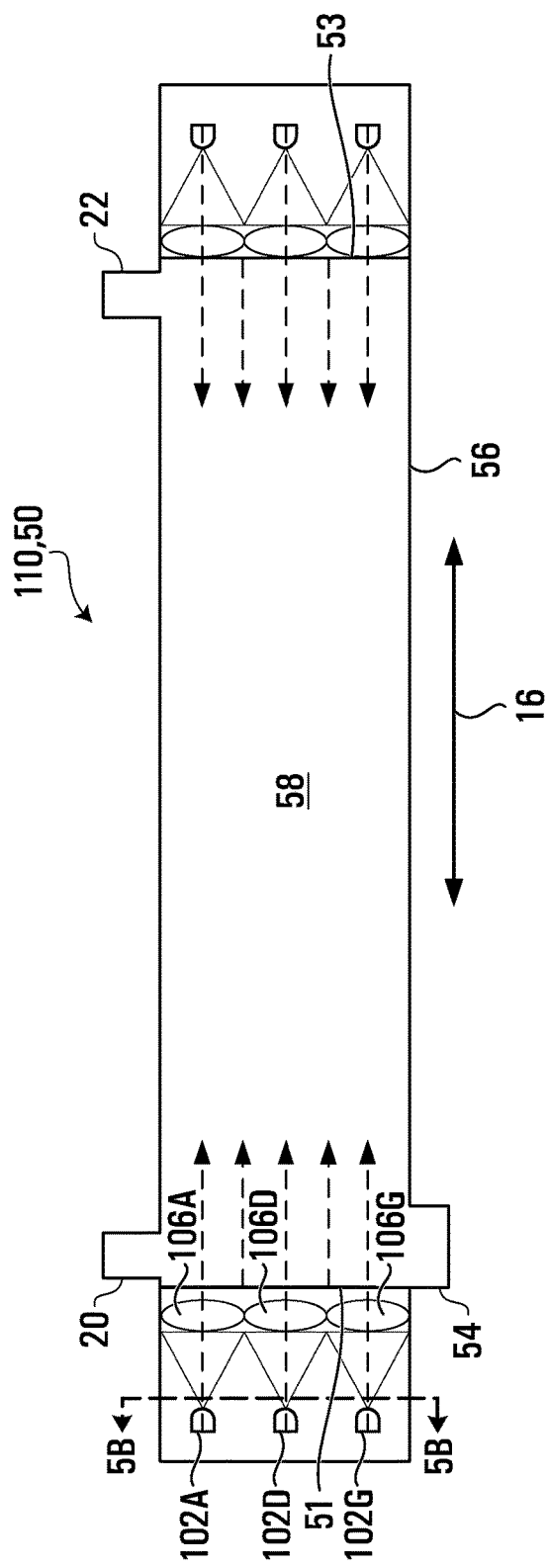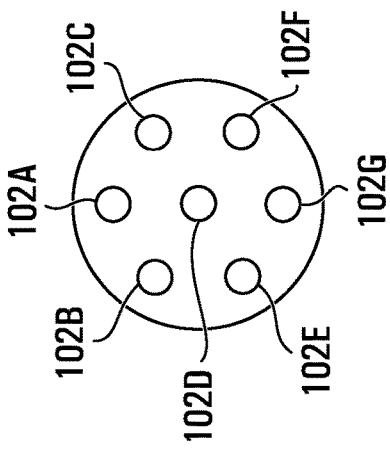
FIG. 5A
FIG. 5B

FLUID FLOW CONDUIT WITH FLOW-SHAPING ELEMENT

RELATED APPLICATION

This application claims the benefit of, and priority to, U.S. provisional patent application No. 62/563,060 filed Sep. 25, 2017.

TECHNICAL FIELD

This disclosure relates to controlling hydrodynamics in fluid flow conduits. Particular embodiments may have application to fluid flow conduits used to provide various types of reactors (e.g. chemical reactors, bio-reactors, photo-reactors and/or the like) which may be used for water treatment or other industrial applications.

BACKGROUND

Fluid travel at non-uniform speeds in a fluid flow conduit may be undesirable.

For example, a photo reactor may be used to treat water and/or other fluids by exposing fluid in the photo reactor to electromagnetic radiation, such as ultraviolet ("UV") radiation from one or more UV sources such as UV-light-emitting diodes ("UV-LEDs"), for example. However, fluids may travel at non-uniform speeds through some photo reactors. Therefore, in such photo reactors, fluids that travel at relatively low speeds may be exposed to electromagnetic radiation for enough time to be treated effectively. However, fluids that travel at relatively high speeds may not be exposed to electromagnetic radiation for enough time to be treated effectively and may therefore maintain any contamination of the fluid. Fluid travel at non-uniform speeds may also be undesirable in other fluid flow conduits, such as chemical reactors, bio-reactors, or photo-reactors, for example.

A flow-restraining element positioned in such fluid flow conduits may provide more-uniform fluid travel speeds, but such flow-restraining elements may be undesirable. For example, such a flow-restraining element positioned in a photo-reactor may block a radiation path and interfere with operation of the photo-reactor.

The foregoing examples of the related art and limitations related thereto are intended to be illustrative and not exclusive. Other limitations of the related art will become apparent to those of skill in the art upon a reading of the specification and a study of the drawings.

SUMMARY

According to one embodiment, there is provided a fluid flow conduit comprising: a body comprising a channel-defining surface which defines a principal flow channel extending in a longitudinal direction, wherein the body defines an interior flow region comprising the principal flow channel; an inlet for introducing fluid into the interior flow region, the inlet shaped so that an average velocity of fluid entering the interior flow region from the inlet is oriented in an inlet flow direction non-parallel to the longitudinal direction; and an outlet for conveying fluid out of the principal flow channel, the outlet spaced apart from the inlet in the longitudinal direction such that fluid that passes from the inlet to the outlet passes through at least a portion of the principal flow channel; wherein the fluid flow conduit defines a recess in the interior flow region and facing the inlet.

In some embodiments, the recess is positioned generally along the inlet flow direction from the inlet.

In some embodiments, the recess is recessed relative to the channel-defining surface.

In some embodiments, the inlet flow direction is substantially orthogonal to the longitudinal direction.

In some embodiments, the principal flow channel has a notional channel axis which extends longitudinally through a centroid of a flow-channel cross-section of the principal flow channel.

In some embodiments, the recess extends to a distance that is farther from the notional channel axis than a distance between the notional channel axis and the channel-defining surface.

In some embodiments, the fluid flow conduit further comprises a flow-shaping element comprising a flow-shaping surface which defines a flow-shaping region in the interior flow region for conveying fluid from the inlet to the principal flow channel, the flow-shaping surface defines at least a portion of the recess, and a flow-shaping cross-section of the flow-shaping region satisfies a flow-shaping condition.

In some embodiments, the flow-shaping condition comprises that a flow-shaping distance, extending in a flow-shaping direction extending between the intersection of the channel axis with the flow-shaping cross-section and the flow-shaping surface, is greater than a principal-channel distance extending in the flow-shaping direction between the intersection of the channel axis with the flow-channel cross-section and the channel-defining surface.

In some embodiments, the flow-shaping condition comprises that a flow-shaping distance, extending in a flow-shaping direction extending between the intersection of the channel axis with the flow-shaping cross-section and the flow-shaping surface, is greater than a reference distance extending opposite to the flow-shaping direction and between the intersection of the channel axis with the flow-shaping cross-section and the flow-shaping surface.

In some embodiments, the flow-channel cross-section is located at an edge of the principal flow channel closest to the flow-shaping element.

In some embodiments, the flow-channel cross-section is located within a region that is twice the principal-channel distance from an edge of the principal flow channel closest to the flow-shaping element.

In some embodiments, the flow-channel cross-section is located within a region that is twice a principal-channel distance from an edge of the principal flow channel closest to the flow-shaping element, and the principal-channel distance extends in the flow-shaping direction between the intersection of the channel axis with the flow-channel cross-section and the channel-defining surface.

In some embodiments, the flow-shaping direction is an inlet-projection direction that coincides with a projection of the inlet flow direction onto the flow-shaping cross-section.

In some embodiments, the flow-shaping direction extends between the intersection of the channel axis with the flow-shaping cross-section and a location on the flow-shaping surface where a projection of the inlet flow direction onto the flow-shaping cross-section intersects the flow-shaping surface.

In some embodiments, the flow-shaping condition is satisfied for flow-shaping cross-sections over at least 60% of the longitudinal direction extent of the flow-shaping element.

In some embodiments, the flow-shaping condition is satisfied for flow-shaping cross-sections over at least 80% of the longitudinal direction extent of the flow-shaping element.

In some embodiments, the flow-shaping condition comprises that, for the flow-shaping cross-section of the flow-shaping region, a flow-shaping dimension in any transverse direction that:

(1) is orthogonal to the longitudinal direction;
(2) extends between the intersection of the channel axis with the flow-shaping cross-section and the flow-shaping surface; and
(3) is angularly spaced apart from the flow-shaping direction;

is less than the flow-shaping distance.

In some embodiments, the flow-shaping condition comprises that, for the flow-shaping cross-section of the flow-shaping region, the flow-shaping dimension decreases with increased angular spacing of the direction of extension of the flow-shaping dimension from the flow-shaping direction.

In some embodiments, the flow-shaping condition comprises that, for the flow-shaping cross-section of the flow-shaping region, the flow-shaping dimension is equal to the principal-channel distance for any transverse direction angularly spaced more than 90° from the inlet projection direction.

In some embodiments, the flow-shaping condition comprises that, for the flow-shaping cross-section of the flow-shaping region, the flow-shaping dimension is equal to the reference distance for any transverse direction angularly spaced more than 90° from the inlet projection direction.

In some embodiments, the flow-shaping condition comprises that, for the flow-shaping cross-section of the flow-shaping region, a flow-shaping dimension in any transverse direction that:

(1) is orthogonal to the longitudinal direction;
(2) extends between the intersection of the channel axis with the flow-shaping cross-section and the flow-shaping surface; and
(3) is angularly spaced apart from the flow-shaping direction by less than or equal to 90°; is equal to the flow-shaping distance.

In some embodiments, the inlet flow direction is orthogonal to the longitudinal direction and the flow-shaping direction is the same as the inlet flow direction.

In some embodiments, the inlet flow direction comprises a first component in the flow-shaping direction and a second component in the longitudinal direction and a ratio of an amplitude of the first component to an amplitude of the second component is greater than or equal to 1:1.

In some embodiments, the inlet flow direction comprises a first component in the flow-shaping direction and a second component in the longitudinal direction and a ratio of an amplitude of the first component to an amplitude of the second component is greater than or equal to $\sqrt{3}$:1.

In some embodiments, the flow-shaping cross-section extending +/−90° from the flow-shaping direction comprises a portion of a circle, an ellipse, a pie, a square, a rectangle, a triangle, a trapezoid, or a hexagon.

In some embodiments, the flow-shaping condition comprises that, for the flow-shaping cross-section of the flow-shaping region, a flow-shaping dimension in any transverse direction that:

(1) is orthogonal to the longitudinal direction;
(2) extends between the intersection of the channel axis with the flow-shaping cross-section and the flow-shaping surface; and
(3) is angularly spaced apart from the flow-shaping direction by less than or equal to a threshold angle;

is greater than the flow-shaping distance.

In some embodiments, the flow-shaping distance is substantially the same for flow-shaping cross-sections at any longitudinal direction location of the flow-shaping region.

In some embodiments, the flow-shaping distance is relatively large for at least some cross-sections longitudinally spaced apart from the principal flow channel and relatively small for at least some cross-sections located relatively closer to the principal flow channel in the longitudinal direction.

In some embodiments, the fluid flow conduit further comprises a flow-shaping surface which defines a flow-shaping region in the interior flow region for conveying fluid from the inlet to the principal flow channel, and at least a portion of the flow-shaping surface extends between the inlet and the notional channel axis.

In some embodiments, the flow-shaping surface and the flow-shaping region surround the notional channel axis.

In some embodiments, the recess surrounds the notional channel axis.

In some embodiments, the flow-shaping surface prevents fluid in the interior flow region from entering a region that is at least large enough to include an extension of the principal flow channel in the longitudinal direction through the flow-shaping region.

In some embodiments, the fluid flow conduit defines a space that is open at a longitudinal end of the fluid flow conduit and that is at least large enough to include the extension of the principal flow channel in the longitudinal direction through the flow-shaping region.

In some embodiments, the inlet extends along an inlet axis and comprises at least one inlet flow modifying element that causes the inlet flow direction to be non-parallel to the inlet axis.

In some embodiments, the inlet flow modifying element comprises at least one baffle.

In some embodiments, the principal flow channel is between opposite longitudinal ends of the fluid flow conduit.

In some embodiments, the fluid flow conduit is part of a chemical or biochemical reactor.

In some embodiments, the fluid flow conduit is part of a photo-reactor.

In some embodiments, the photo-reactor comprises at least one visible light LED positioned to illuminate at least the principal flow channel.

In some embodiments, the at least one visible light LED each has a principal illumination axis extending the longitudinal direction.

In some embodiments, the photo-reactor comprises at least one UV-LED positioned to direct radiation into at least the principal flow channel.

In some embodiments, the at least one UV-LED each has a principal radiation emission axis extending the longitudinal direction.

In some embodiments, the at least one UV-LED is a plurality of UV-LEDs.

In some embodiments, the fluid flow conduit is part of a reactor for irradiating a flow of fluid with electromagnetic radiation, the reactor comprising an electromagnetic radiation emitter positioned for directing radiation from the electromagnetic radiation emitter to impinge on fluid flowing in at least the principal flow channel.

In some embodiments, the fluid flow conduit further comprises a radiation-focusing element positioned in a radiation path of radiation emitted from the electromagnetic radiation emitter for directing radiation from the electromagnetic radiation emitter to impinge on the fluid flowing in at least the principal flow channel.

In some embodiments, the radiation from the electromagnetic radiation emitter has a principal radiation emission axis and is directed such that the principal radiation emission axis extends in the longitudinal direction when the radiation impinges on the fluid flowing in at least the principal flow channel.

According to another embodiment, there is provided a UV-photo reactor comprising: the fluid flow conduit; and at least one UV-LED located at a longitudinal end of the fluid flow conduit for directing radiation into at least the principal flow channel.

In some embodiments, the at least one UV-LED each has a principal radiation emission axis extending in the longitudinal direction.

In some embodiments, the UV-photo reactor further comprises one or more lenses located between each of the at least one UV-LED and the principal flow channel, the one or more lenses shaped for directing UV energy from the UV-LED into at least the principal flow channel in the longitudinal direction.

In some embodiments, the at least one UV-LED is a plurality of UV-LEDs.

Other aspects and features will become apparent to those ordinarily skilled in the art upon review of the following description of illustrative embodiments in conjunction with the accompanying figures.

BRIEF DESCRIPTION OF THE DRAWINGS

FIG. 5A illustrates a cross-section of a photo-reactor including the fluid flow conduit similar to that of FIG. 1A according to another embodiment.

FIG. 5B is another cross-sectional view of the photo-reactor of FIG. 5A, taken along the cross-sectional plane 5B shown in FIG. 5A.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1A:
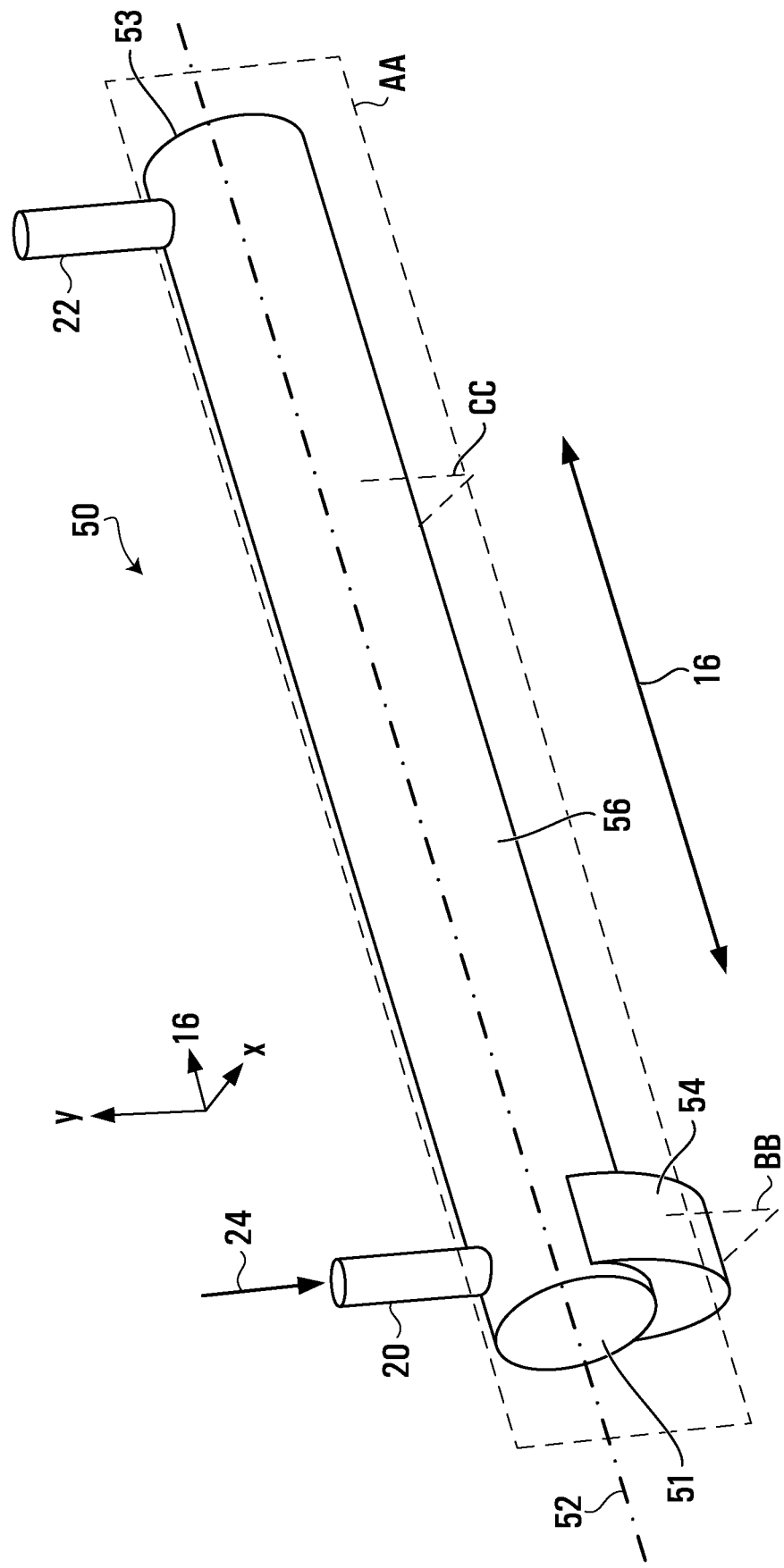
FIG. 1A is a perspective view of a fluid flow conduit according to one embodiment.
Figure 1B:
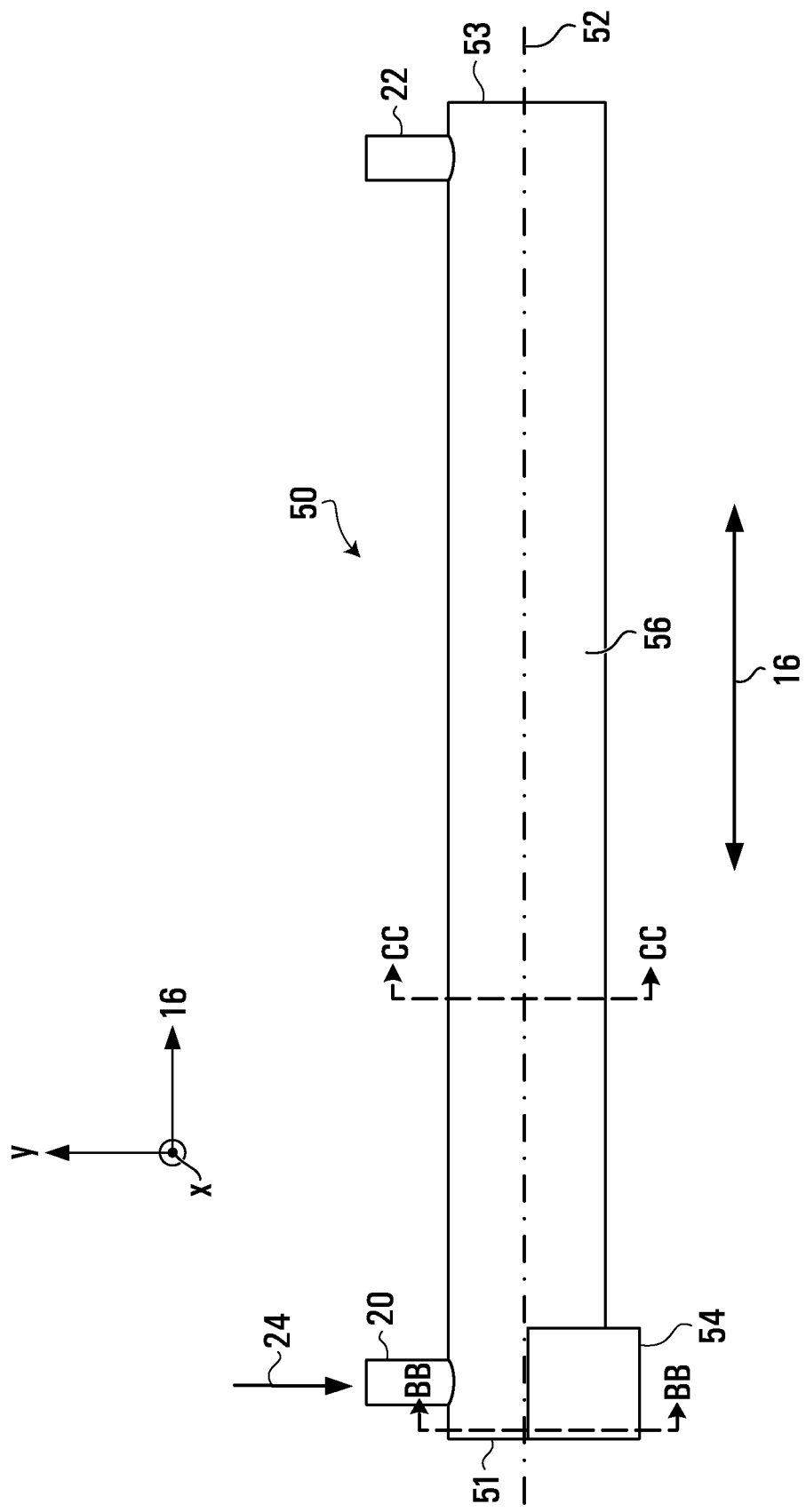
FIG. 1B is a side view of the fluid flow conduit of FIG. 1A.
Figure 1C:
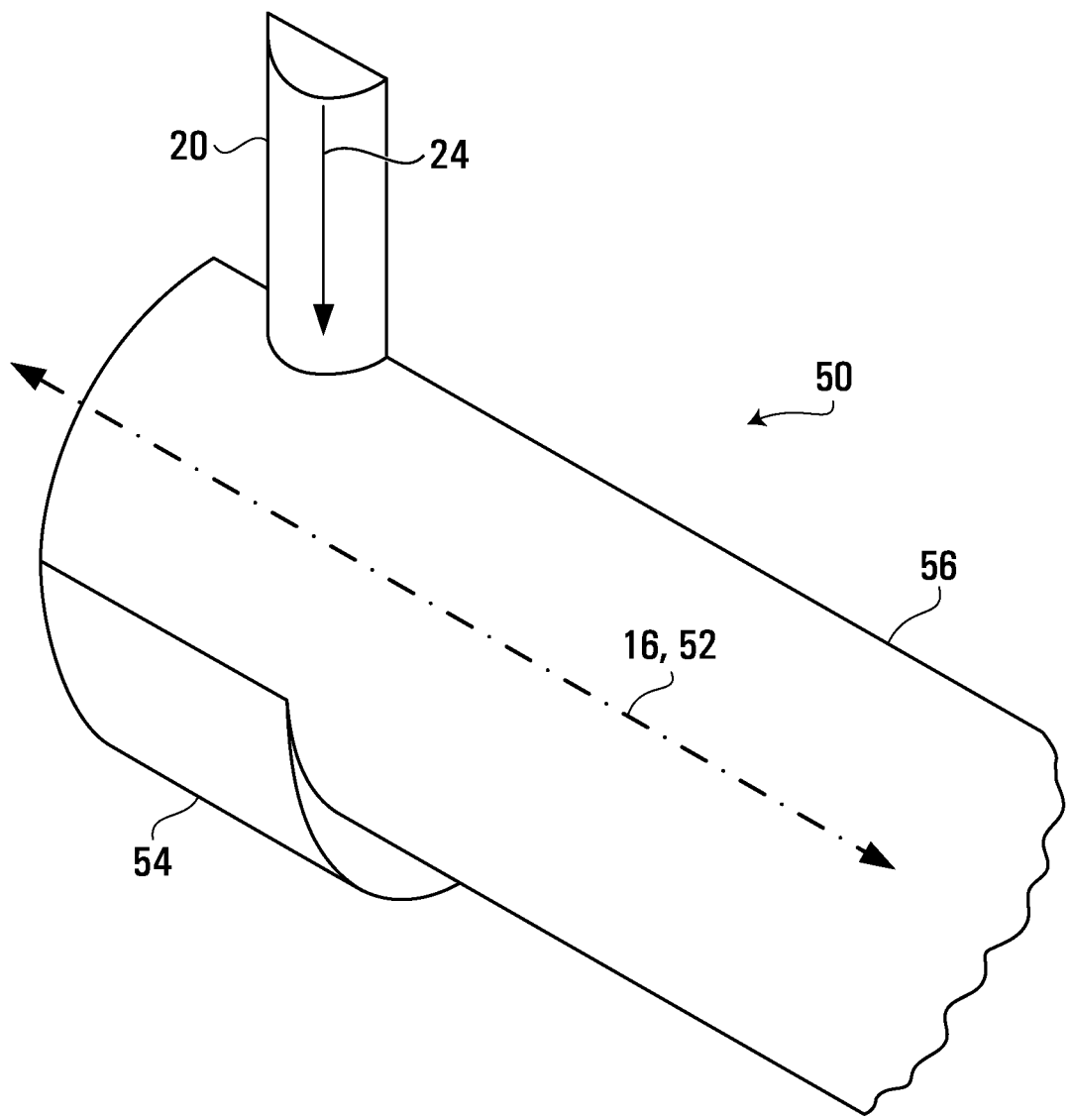
FIG. 1C is a different perspective view of part of the fluid flow conduit of FIG. 1A.
Figure 2A:
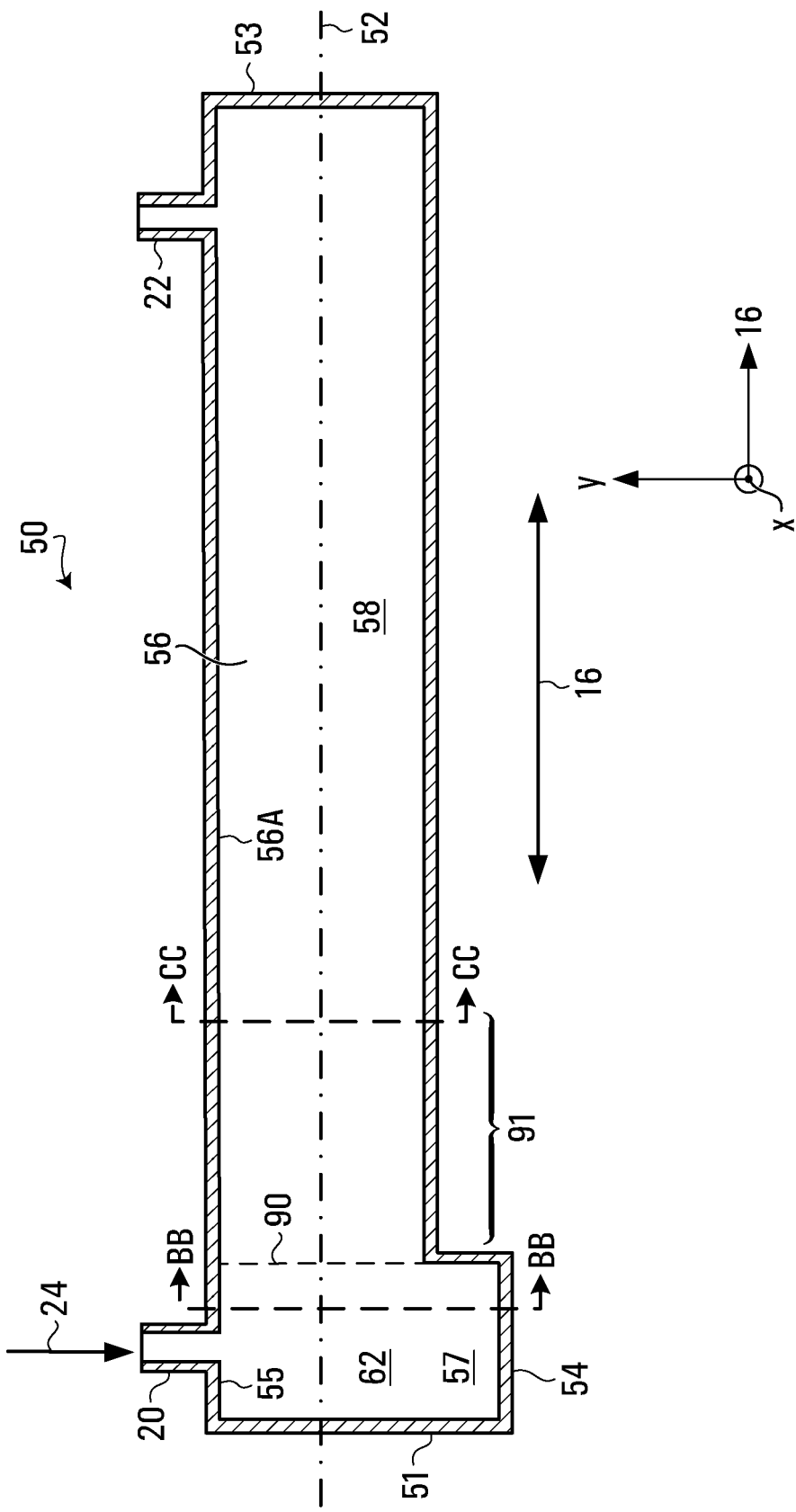
FIG. 2A is a cross-sectional view of the fluid flow conduit of FIG. 1A, taken along the cross-sectional plane AA shown in FIG. 1A.
Figure 2C:
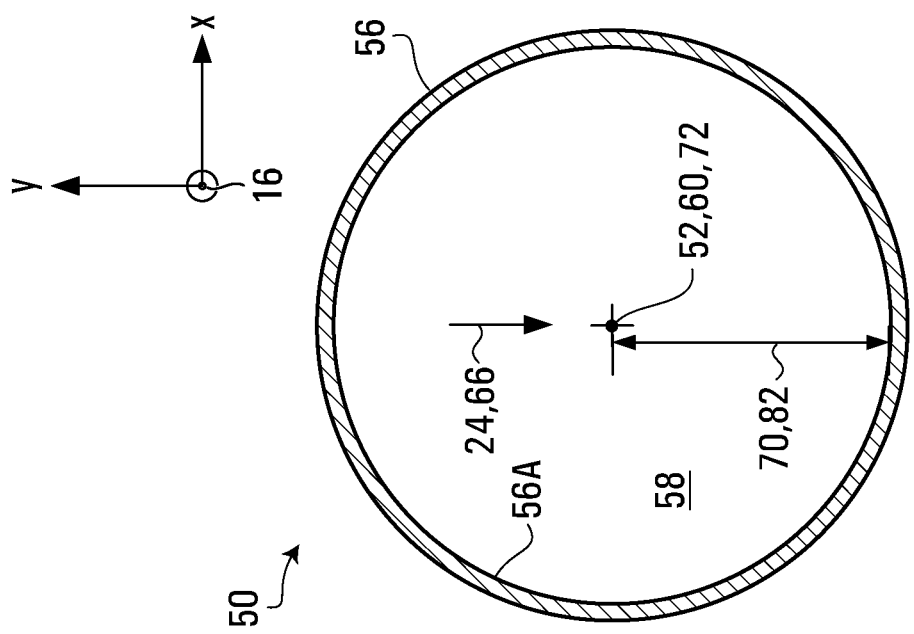
FIG. 2C is a cross-sectional view of the fluid flow conduit of FIG. 1A, taken along the cross-sectional plane CC shown in FIGS. 1A and 2A.
Figure 2B:
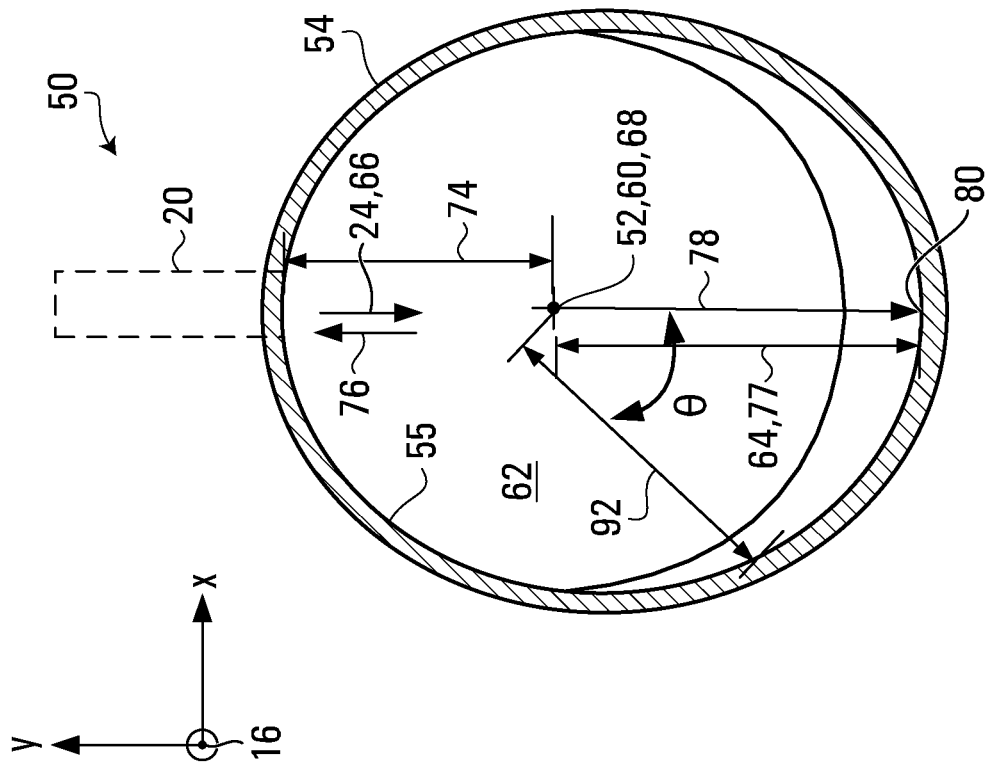
FIG. 2B is a cross-sectional view of the fluid flow conduit of FIG. 1A, taken along the cross-sectional plane BB shown in FIGS. 1A and 2A.
Figure 2D:
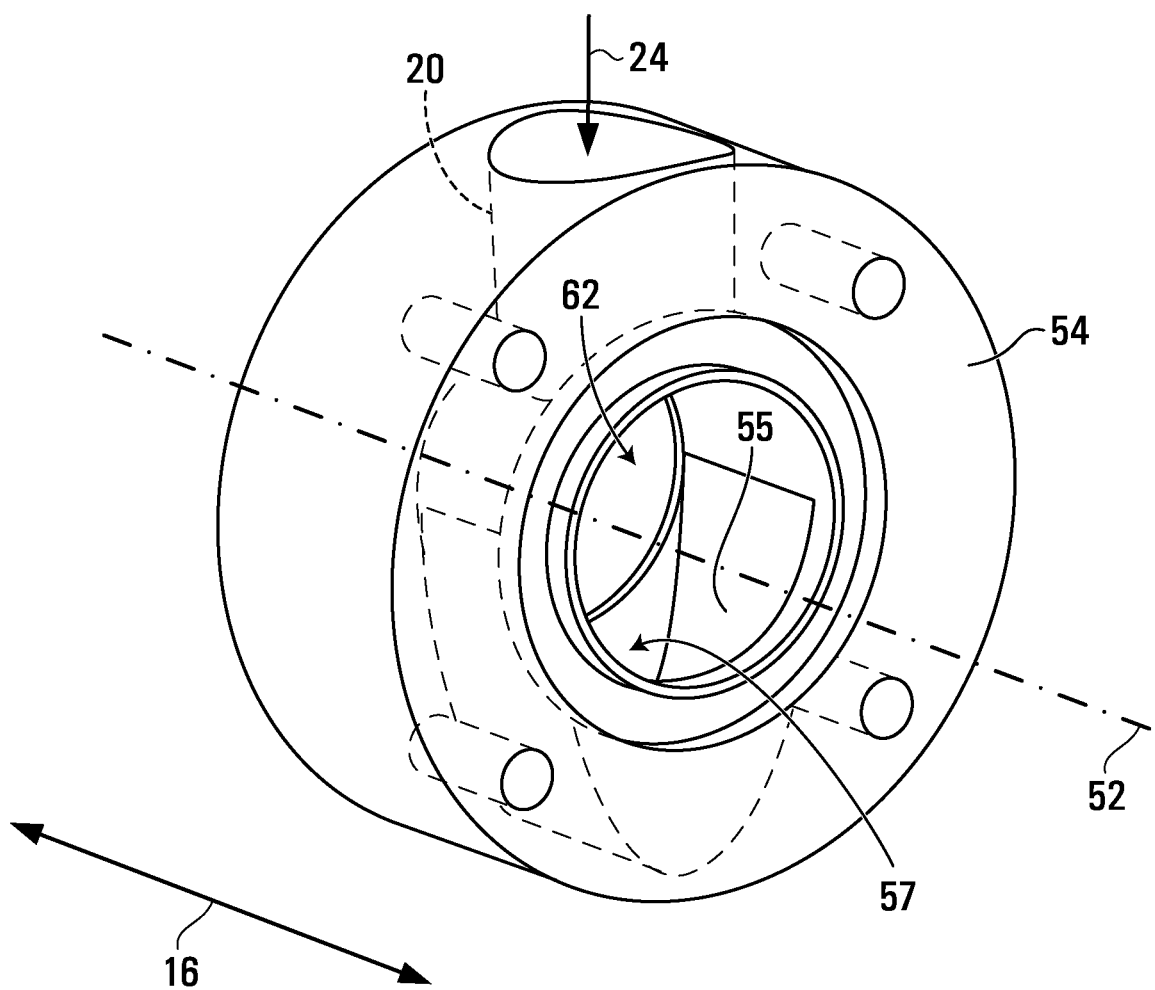
FIG. 2D is a perspective view of a flow-shaping element of the fluid flow conduit of FIG. 1A.

FIGS. 1A-1C (collectively FIG. 1) show various views of a fluid flow conduit 50 according to a particular embodiment. FIG. 2A is a schematic cross-sectional view of the FIG. 1 fluid flow conduit 50 taken along a cross-sectional plane AA (see FIG. 1A) that includes a central channel axis 52. FIG. 2B is a schematic transverse cross-sectional view of the FIG. 1 fluid flow conduit 50 in a cross-sectional plane BB (see FIGS. 1A and 1B) that is orthogonal to the central channel axis 52 and to the cross-sectional plane AA of FIG. 2A taken in the flow-shaping element 54. FIG. 2C is a schematic transverse cross-sectional view of the FIG. 1 fluid flow conduit 50 in a cross-sectional plane CC (see FIGS. 1A and 1B) that is orthogonal to the central channel axis 52 and to the cross-sectional plane of AA FIG. 2A taken in the principal conduit body 56. FIG. 2D is a perspective view of the flow-shaping element 54 of the FIG. 1 fluid flow conduit 50. FIGS. 2A, 2B, 2C and 2D may be referred to herein collectively as FIG. 2.

In the illustrated embodiment of FIGS. 1 and 2, fluid flow conduit 50 comprises an inlet 20 and an outlet 22, which may be on a side of fluid flow conduit 50, and fluid flow conduit 50 may convey fluid in a longitudinal direction 16 from inlet 20 to outlet 22 such that fluid that passes from the inlet 20 to the outlet 22 passes through at least a portion of the principal flow channel 58 described below. One or both of the longitudinal ends 51, 53 may be transparent or translucent to visible light, to UV radiation, to other electromagnetic radiation, or to two or more thereof, and it can be desirable to position one or more light sources or other electromagnetic radiation emitters (shown at 102, 104 in FIG. 4 or at 102A-102G in FIGS. 5A and 5B, for example) at or near the longitudinal ends 51, 53 of fluid flow conduit 50 so that principal illumination axes (or, more generally, principal radiation emission axes) of such one or more electromagnetic radiation emitters can be aligned in the longitudinal direction 16 (e.g. parallel and/or antiparallel to the direction of fluid flow though conduit 50—see FIGS. 4 and 5A, for example, or in one or more other directions). In such cases, it can be desirable to provide inlet 20 and/or outlet 22 on a side of conduit 50 so as to be able to locate such one or more electromagnetic radiation emitters in this manner. It can also be desirable to provide inlet 20 and/or outlet 22 on a side of conduit 50 in other cases or circumstances. However, alternative embodiments may differ. For example, in other embodiments, the inlet and outlet may differ in position, in orientation, and/or in other ways.

In the illustrated embodiment of FIGS. 1 and 2, inlet 20 is configured to direct fluid into the interior of conduit 50 in an inlet flow direction 24 (i.e. such that an average velocity of the fluid directed into an interior flow region (including the flow-shaping bore or region 62 and the principal flow channel 58) of the conduit 50 from inlet 20 is oriented in inlet flow direction 24). Inlet flow direction 24 is not oriented in longitudinal direction 16 and is non-parallel to the longitudinal direction 16. In the illustrated embodiment, inlet flow direction 24 is orthogonal to longitudinal direction 16, but inlet flow direction 24 may vary in other embodiments and may not necessarily be orthogonal to longitudinal direction 16—see FIGS. 3M and 3N, for example.

In some embodiments, such as the illustrated embodiment of FIGS. 1 and 2 for example, inlet 20 will have a bore diameter that is less than the bore diameter of conduit 50. Of course inlet 20 and conduit 50 need not be bores, so more generally, in some embodiments, inlet 20 may have a cross-sectional area that is less than the cross-sectional area of conduit 50. Consequently, in such embodiments, for a given flow rate, the average velocity of fluid in inlet 20 may be higher than the average velocity of fluid in conduit 50.

The principal conduit body 56 extends in longitudinal direction 16 and comprises a channel-defining surface 56A, which defines a longitudinally extending principal flow channel 58, which also extends in longitudinal direction 16. Principal flow channel 58 (see FIG. 2C) of the illustrated embodiment shown in FIGS. 1 and 2 is circular in transverse cross-section (i.e. in traverse cross-sectional planes incorporating the x and y axes shown in FIGS. 1 and 2 and generally orthogonal to the longitudinal direction 16—see, for example, in the transverse cross-sectional plane CC shown in FIG. 1A). This is not generally necessary and principal flow channel 58 may have any suitable cross-sectional shape and the cross-sectional shape of principal flow channel may be different (e.g. larger or smaller or otherwise differently shaped) at various transverse cross-sections of principal conduit body 56. A notional channel axis 52 may be defined which extends in longitudinal direction 16 through a centroid 60 of the flow-channel cross-section (i.e. through a centroid 60 of a transverse cross-section of principal flow channel 58)—see FIG. 2C. In the case where each flow-channel cross-section is circular (as is the case for the illustrated embodiment of FIGS. 1 and 2), channel axis 52 extends through the center of each flow-channel cross-section.

Fluid flow conduit 50 also comprises flow-shaping element 54 located between inlet 20 and principal conduit body 56. Flow-shaping element 54 comprises a bore-defining surface (or a flow-shaping surface that may not necessarily define a bore) 55 which defines a flow-shaping bore (or a flow-shaping region that may not necessarily be a bore) 62 for conveying fluid from inlet 20 to principal flow channel 58 such that fluid that passes from inlet 20 to outlet 22 passes through at least a portion of flow-shaping bore 62 and then through at least a portion of the principal flow channel 58. The transverse cross-sectional shape of flow-shaping bore 62 (which may be referred to herein as a flow-shaping cross-section (see FIG. 2B)) is different from that of the transverse cross-section of principal flow channel 58 (which may be referred to herein as a flow-channel cross-section (see FIG. 1C)). Specifically, a flow-shaping cross-section of flow-shaping bore 62 may be shaped to satisfy a flow-shaping condition, which serves to provide a more uniform velocity profile in conduit 50.

FIG. 1A illustrates the flow-shaping element 54 slightly offset from the longitudinal end 51, whereas FIGS. 1B, 1C, and 2A show the flow-shaping element 54 extending to the longitudinal end 51. As a result, fluid flow in an embodiment according to FIG. 1A may differ from fluid flow in an embodiment according to FIGS. 1B, 1C, and 2A. In general, embodiments such as those described herein may or may not include such an offset and may differ in still other ways.

The principal conduit body 56 and the flow-shaping element 54 are described for clarity, and such description is not intended to imply that a principal conduit body and a flow-shaping element are necessarily separate, separable, or distinct. Rather, embodiments may be unitary or may be assembled from one or more components, and such components are not necessarily the principal conduit body 56 and the flow-shaping element 54 as described herein.

In some embodiments, such as the illustrated embodiment of FIGS. 1 and 2 or other embodiments, the flow-shaping condition comprises that a flow-shaping distance 64
  (1) extending in an inlet-projection direction (or, more generally, a flow-shaping direction) 66 and
  (2) extending between
    (a) an intersection 68 of the channel axis 52 with the flow-shaping cross-section and
    (b) the bore-defining surface 55
is greater than a principal-channel distance 70 extending
  (1) in the inlet-projection direction 66 and
  (2) between
    (a) the intersection 72 of the channel axis 52 with the flow-channel cross-section and
    (b) the channel-defining surface 56A
(compare flow-shaping distance 64 (FIG. 2B) and principal channel distance 70 (FIG. 2C)).

Figure 3A:
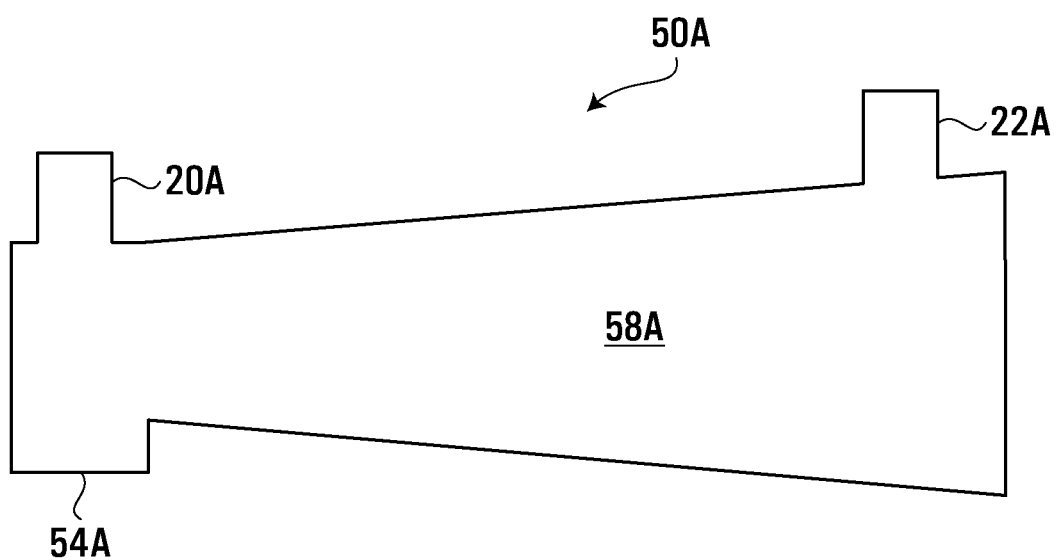
FIGS. 3A-3N illustrate fluid flow conduits according to other embodiments.
Figure 3B:
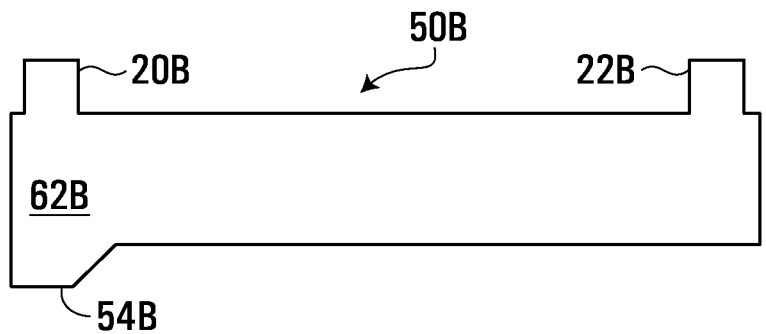
Figure 3C:
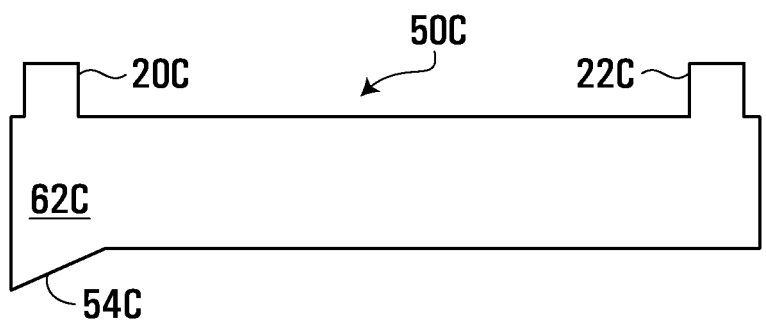
Figure 3D:
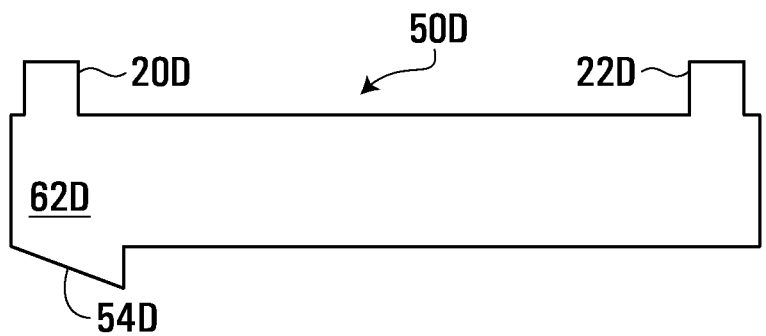
Figure 3E:
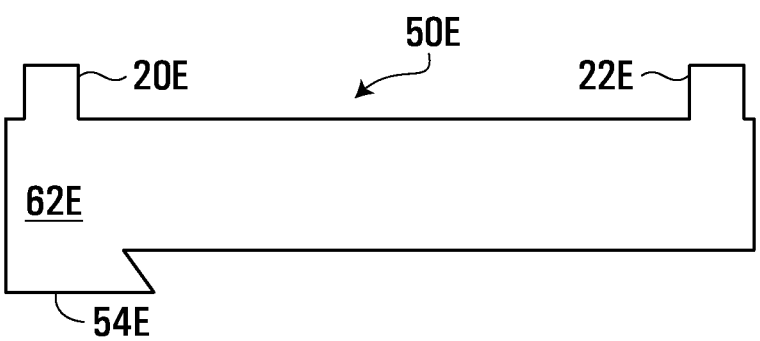
Figure 3F:
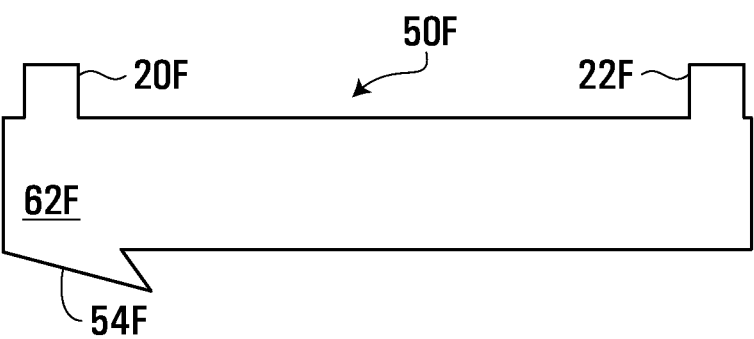
Figure 3G:
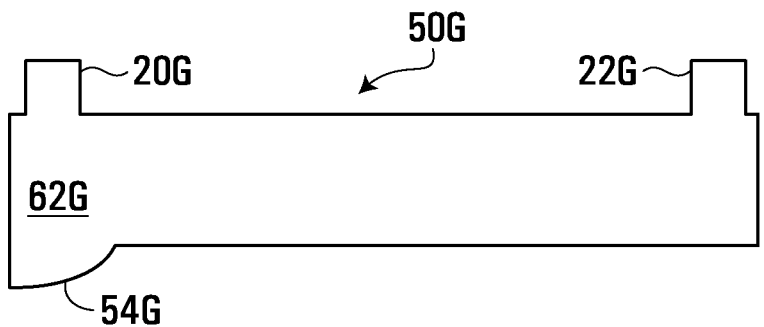
Figure 3H:
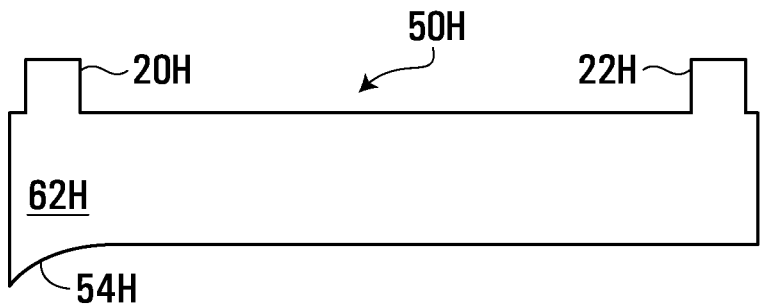
Figure 3I:
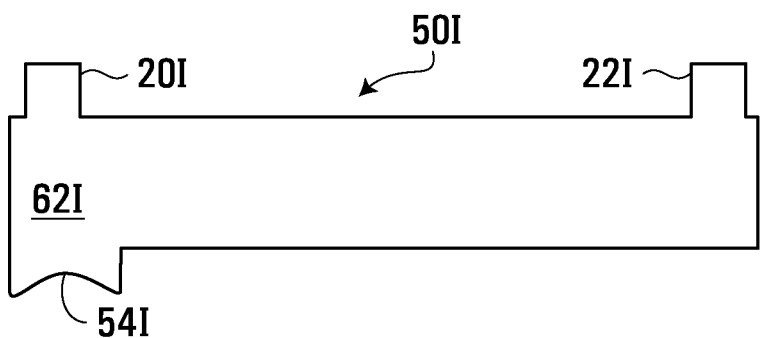
Figure 3J:
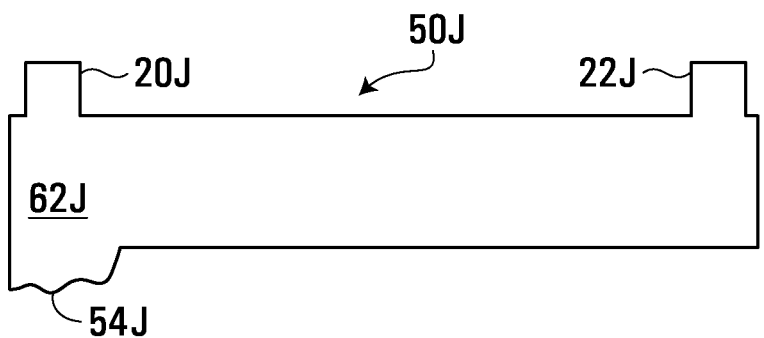

The inlet-projection direction 66 may be defined to coincide with a projection of the inlet flow direction 24 onto the flow-shaping cross-section. In the case of the illustrated embodiment shown in FIG. 2B, the inlet flow direction 24 is in the plane of the flow-shaping cross-section and, consequently, the inlet projection direction 66 is the same as the inlet flow direction 24, but this is not generally necessary (as shown in FIGS. 3M and 3N, for example). More generally, in other embodiments, the flow-shaping direction may be another direction between
  (1) the intersection 68 of the channel axis 52 with the flow-shaping cross-section and
  (2) the bore-defining surface 55.

In some embodiments, such as the illustrated embodiment of FIGS. 1 and 2 or other embodiments, the flow-shaping condition comprises that a first flow-shaping distance 64
  (1) extending in an inlet-projection direction (or, more generally, a flow-shaping direction) 66 and
  (2) extending between
    (a) the intersection 68 of the channel axis 52 with the flow-shaping cross-section and
    (b) the bore-defining surface 55 is greater than a second flow-shaping distance (or a reference distance) 74 extending
 (1) in a second direction 76 opposite to the inlet-projection direction 66 and
 (2) between
  (a) the intersection 68 of the channel axis 52 with the flow-shaping cross-section and
  (b) the bore-defining surface 55
(compare first flow-shaping distance 64 and second flow-shaping distance 74 (FIG. 2B)).

The inlet-projection direction 66 may be defined to coincide with a projection of the inlet flow direction 24 onto the flow-shaping cross-section. However, in other embodiments, the flow-shaping direction may be another direction between
 (1) the intersection 68 of the channel axis 52 with the flow-shaping cross-section and
 (2) the bore-defining surface 55.

In some embodiments, such as the illustrated embodiment of FIGS. 1 and 2 or other embodiments, the flow-shaping condition comprises that a flow-shaping distance 77 extending
 (1) in a flow-shaping direction 78
 (2) between
  (a) the intersection 68 of the channel axis 52 with the flow-shaping cross-section and
  (b) a location 80 on the bore-defining surface 55 where a projection 66 of the inlet flow direction 24 onto the flow-shaping cross-section intersects the bore-defining surface 55
is greater than a principal-channel distance 82 extending
 (1) in the flow-shaping direction 78
 (2) between
  (a) the intersection 72 of the channel axis 52 with the flow-channel cross-section and
  (b) the channel-defining surface 56A
(compare flow-shaping distance 77 (FIG. 2B) with principal-channel distance 82 (FIG. 2C)).

The flow-shaping direction 78 may be defined as a direction between
 (1) the intersection 68 of the channel axis 52 with the flow-shaping cross-section and
 (2) the location 80 on the bore-defining surface 55 where the projection 66 of the inlet flow direction 24 onto the flow-shaping cross-section intersects the bore-defining surface 55.

As a result of one or more flow-shaping conditions as described above, for example, the bore-defining surface 55 in the illustrated embodiment of FIGS. 1 and 2 defines a recess 57 facing the inlet 20. In the illustrated embodiment of FIGS. 1 and 2, the recess 57 extends to a distance (for example, the distance 64 or 77 as discussed above) that is farther from the central channel axis 52 than a distance (for example, the distance 70 or 82 as discussed above) between the central channel axis 52 and the channel-defining surface 56A, and the recess 57 is therefore recessed relative to the channel-defining surface 56A. Further, in the illustrated embodiment of FIGS. 1 and 2, as shown in FIG. 2A, following a straight line in the inlet flow direction 24 from the inlet 20 leads generally to the recess 57, so the recess 57 is positioned generally along the inlet flow direction 24 from the inlet 20.

In other words, the recess 57 may be an extension of the interior flow region (which, as indicated above, may include the flow-shaping bore or region 62 and the principal flow channel 58) in a transverse or radial direction in a location where fluid that enters the interior flow region tends to impact the surface defining the interior flow region. Such an extension of the interior flow region may introduce a step-change that may decelerate the fluid flow from the inlet 20 and may prevent much higher than average velocity for part of the fluid in the longitudinal direction. The position and/or shape of the recess can be configured to provide a variety of different flow distribution patterns in the interior flow region, in particular in a portion of the interior flow region closer to the inlet 20. Therefore, as described below, for example, alternative embodiments may include one or more recesses that may differ from the recess 57 and that may be positioned differently from the recess 57.

As discussed above, in some embodiments, the principal flow channel may have different cross-sectional shapes and various locations along its longitudinal extension. As one example, FIG. 3A schematically depicts an embodiment of a fluid flow conduit 50A according to a particular embodiment, where the cross-sectional shape of a principal flow channel 58A of the fluid flow conduit 50A increases in cross-sectional area as principal flow channel 58A extends longitudinally further from a flow-shaping element 54A of the fluid flow conduit 50A. In other respects, the FIG. 3A fluid flow conduit 50A may share characteristics of the fluid flow conduit 50 shown in FIGS. 1 and 2 (or of one or more other fluid flow conduits such as those described herein, for example). FIG. 3A is just one example, and in other embodiments, the principal flow channel may vary in other ways.

In some embodiments, such as the illustrated embodiment of FIGS. 1 and 2 or other embodiments, the flow-channel cross-section used for evaluating the flow-shaping condition may comprise a flow-channel cross-section located at an edge of the principal flow channel closest to the flow-shaping element—see edge 90 of principal flow channel 58 shown schematically by dashed line 90 in FIG. 2A as one example of such an edge of a principal flow channel closest to a flow-shaping element. In some embodiments, such as the illustrated embodiment of FIGS. 1 and 2 for example, the flow-channel cross-section used for evaluating the flow-shaping condition may comprise a flow-channel cross-section that is located within a region 91 that is twice the principal-channel distance 70, 82 from an edge 90 of the principal flow channel 58 closest to flow-shaping element 54.

In the illustrated embodiment of FIGS. 1 and 2, the flow-shaping distance 64, 77 is substantially the same for flow-shaping cross-sections at any longitudinal direction location of the flow-shaping bore 62. However, the flow-shaping region or bore may also vary in cross-sectional shape along its longitudinal extension. In other words, in some embodiments, the flow-shaping distance may be relatively large for at least some cross-sections longitudinally spaced apart from the principal flow channel and relatively small for at least some cross-sections located relatively closer to the principal flow channel in the longitudinal direction. In other embodiments, the flow-shaping distance may be relatively small for at least some cross-sections longitudinally spaced apart from the principal flow channel and relatively large for at least some cross-sections located relatively closer to the principal flow channel in the longitudinal direction. In still other embodiments, the flow-shaping distance may vary in other ways.

For example, FIGS. 3B-3J schematically depict fluid flow conduits 50B-50J according to particular embodiments, where the cross-sectional shapes of flow-shaping regions or bores 62B-62J change for various cross-sections at different longitudinal locations along flow-shaping elements 54B-54J. In other respects, the fluid flow conduits 50B-50J of FIGS. 3B-3J may share characteristics of the fluid flow conduit 50 shown in FIGS. 1 and 2 (or of one or more other fluid flow conduits such as those described herein, for example) and may include inlets 20B-20J and outlets 22B-22J. The illustrated embodiments of FIGS. 3B-3J are examples only, and fluid flow conduits may vary in other ways.

In some embodiments, the flow-shaping condition may be satisfied for flow-shaping cross-sections over at least 60% of the longitudinal direction extent of the flow-shaping element. In some embodiments, the flow-shaping condition may be satisfied for flow-shaping cross-sections over at least 80% of the longitudinal direction extent of the flow-shaping element.

The flow-shaping condition may comprise additional or alternative criteria. For example, as shown in FIGS. 2B and 2D, the flow-shaping condition may comprise that, for the transverse flow-shaping cross-section of the flow-shaping bore 62 (see cross-section BB of FIGS. 1A and 1B), a flow-shaping dimension 92 (FIG. 2B) in any transverse direction that:
  (a) is orthogonal to the longitudinal direction 16;
  (b) extends between the intersection 68 of the channel axis 52 with the flow-shaping cross-section and the bore-defining surface 55; and
  (c) is angularly spaced apart (e.g. by an angle θ) from the inlet-projection direction 66;
is less than the flow-shaping distance 64, 77. In some embodiments, such as the illustrated embodiment of FIGS. 1 and 2 for example, the flow-shaping condition comprises that, for the flow-shaping cross-section of the flow-shaping bore 62, the flow-shaping dimension 92 decreases with increased angular spacing θ of the direction of extension of the flow-shaping dimension 92 from the inlet-projection direction 66. This decrease may be smooth or continuous with variation in angular spacing θ or may be discontinuous with variation in angular spacing θ. In some embodiments, as is the case with the illustrated embodiment shown in FIGS. 1 and 2 for example, the flow-shaping condition comprises that, for the flow-shaping cross-section of the flow-shaping bore 62, the flow-shaping dimension 92 is equal to the principal-channel distance 70, 82 for any transverse direction angularly spaced more than 90° such that θ>90° (or spaced more than some other angular threshold $\theta_{thresh}$ such that $\theta>\theta_{thresh}$) from the inlet projection direction 66.

Figure 3K:
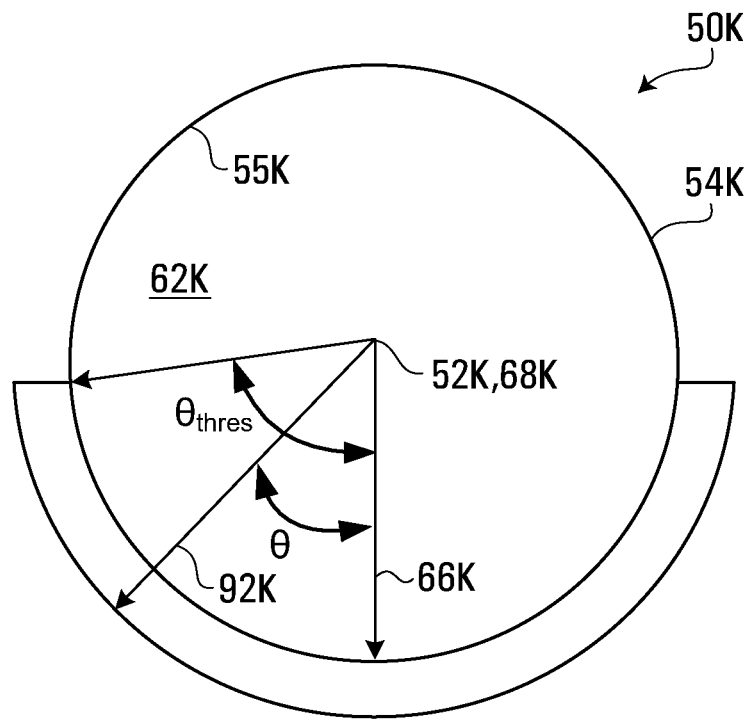

Another example of an additional or alternative criterion for the flow-shaping condition is shown schematically in FIG. 3K, which schematically depicts a transverse cross-section of a flow-shaping element 54K and of a flow-shaping bore (or a flow-shaping region that may not necessarily be a bore) 62K of a fluid flow conduit 50K according to a particular embodiment, where a flow-shaping dimension 92K is constant for angles up to $+/-\theta_{thresh}$ from the inlet projection direction 66K. In some embodiments, $\theta_{thresh}$ is 90°, although this is not necessary. In some such embodiments, the flow-shaping condition comprises that, for the flow-shaping cross-section of the flow-shaping bore 62K, a flow-shaping dimension 92K in any transverse direction that:
  (1) is orthogonal to a longitudinal direction of the fluid flow conduit 50K;
  (2) extends between
    (a) the intersection 68K of a channel axis 52K of the fluid flow conduit 50K with the flow-shaping cross-section and
    (b) a bore-defining surface (or a flow-shaping surface that may not necessarily define a bore) 55K of the flow-shaping element 54K; and
  (3) is angularly spaced apart from an inlet-projection direction 66K by less than or equal to 90° (or some other $\theta_{thresh}$);
is equal to a flow-shaping distance (as described above, for example). In other respects, fluid flow conduit 50K of FIG. 3K may share characteristics of the fluid flow conduit 50 shown in FIGS. 1 and 2 (or of one or more other fluid flow conduits such as those described herein, for example).

In some embodiments, the flow-shaping cross-section extending +/-90° (or $+/-\theta_{thresh}$) from the inlet-projection direction 66 comprises a portion of a circle, an ellipse, a pie, a square, a rectangle, a triangle, a trapezoid, a hexagon or any other polygon.

Figure 3L:
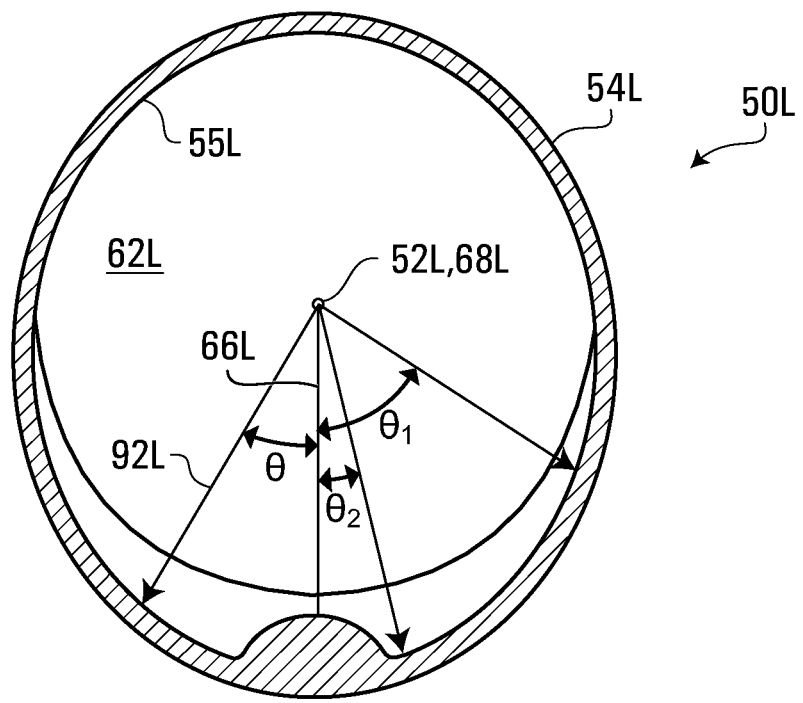
Figure 3M:
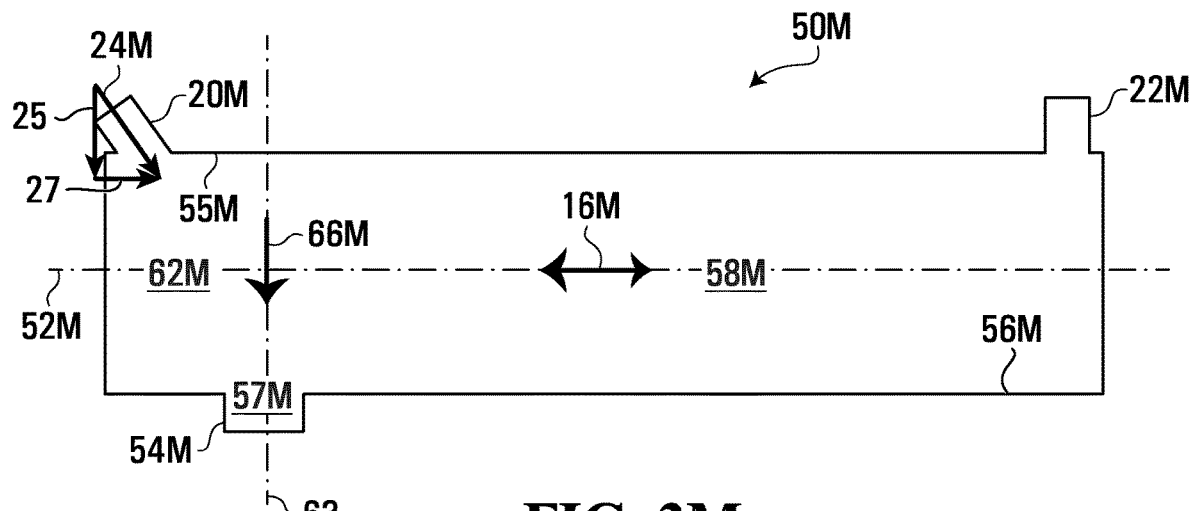
Figure 3N:
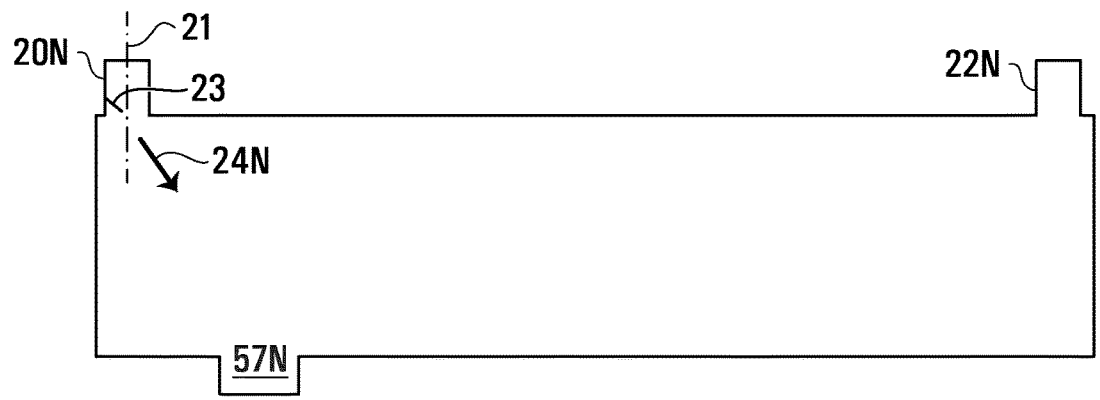

Another example of an additional or alternative criterion for the flow-shaping condition is shown schematically in FIG. 3L, which schematically depicts a transverse cross-section of a flow-shaping element 54L and of a flow-shaping bore (or a flow-shaping region that may not necessarily be a bore) 62L of a fluid flow conduit SOL according to a particular embodiment, where the flow-shaping condition comprises that, for the flow-shaping cross-section of the flow-shaping bore 62L, a flow-shaping dimension 92L in any transverse direction that:
  (1) is orthogonal to a longitudinal direction of the fluid flow conduit SOL;
  (2) extends between
    (a) the intersection 68L of a channel axis 52L of the fluid flow conduit 50L with the flow-shaping cross-section and
    (b) a bore-defining surface (or a flow-shaping surface that may not necessarily define a bore) 55L of the flow-shaping element 54L; and
  (3) is angularly spaced apart from an inlet-projection direction 66L by an angle θ less than or equal to a first threshold angle $\theta_1$;
is greater than a flow-shaping distance (as described above, for example). In some embodiments, such as the illustrated embodiment of FIG. 3L for example, the flow-shaping condition comprises that, for the flow-shaping cross-section of the flow-shaping bore 62L, the flow-shaping dimension 92L
  (1) increases with increased angular spacing θ of the direction of extension of the flow-shaping dimension 92L from the inlet-projection direction 66L to a second threshold angle $\theta_2$ less than the first threshold angle $\theta_1$ and
  (2) decreases with increased angular spacing θ of the direction of extension of the flow-shaping dimension 92L from the second threshold angle $\theta_2$ to the first threshold angle $\theta_1$.

Again, these increases and decreases may be smooth or continuous with variation in angular spacing θ or may be discontinuous with variation in angular spacing θ. In other respects, fluid flow conduit 50L of FIG. 3L may share characteristics of the fluid flow conduit 50 shown in FIGS. 1 and 2 (or of one or more other fluid flow conduits such as those described herein, for example).

As discussed above, in the illustrated embodiment of FIGS. 1 and 2 for example, the inlet flow direction 24 is orthogonal to the longitudinal direction 16 and the inlet-projection direction 66 is the same as the inlet flow direction 24. This is not necessary, however.

For example, FIG. 3M schematically depicts a transverse cross-section of a flow-shaping element 54M and flow-shaping bore (or a flow-shaping region that may not necessarily be a bore) 62M of a fluid flow conduit 50M according to a particular embodiment, where fluid flow conduit 50M has a central channel axis 52M and comprises an inlet 20M and an outlet 22M, which may be on a side of fluid flow conduit 50M. A channel-defining surface 56M of the fluid flow conduit 50M defines a longitudinally extending principal flow channel 58M that conveys fluid from inlet 20M to outlet 22M in a longitudinal direction 16M. The flow-shaping bore 62M has a bore-defining surface (or a flow-shaping surface that may not necessarily define a bore) 55M and a flow-shaping cross-section 63. The inlet 20M is configured to direct fluid into an interior of conduit 50M in an inlet flow direction 24M (i.e. such that an average velocity of the fluid directed into an interior flow region (including the flow-shaping bore 62M and the principal flow channel 58M) of the conduit 50M from inlet 20M is oriented in inlet flow direction 24M). An inlet-projection direction 66M may be defined to coincide with a projection of the inlet flow direction 24M onto the flow-shaping cross-section 63.

In the illustrated embodiment of FIG. 3M, the inlet flow direction 24M is not oriented in longitudinal direction 16M, is non-parallel to the longitudinal direction 16M, and is not orthogonal to longitudinal direction 16M. Rather, the inlet flow direction 24M comprises a first component 25 in the inlet-projection direction 66M and a second component 27 in the longitudinal direction 16M. The illustrated embodiment of FIG. 3M is an example only, and alternative embodiments may have different inlet flow directions.

In the illustrated embodiment of FIG. 3M, the flow-shaping cross-section 63 satisfies a flow-shaping condition such as one or more of the flow shaping conditions as described above. As a result, the bore-defining surface 55M in the illustrated embodiment of FIG. 3M defines a recess 57M that faces the inlet 20M. In the illustrated embodiment of FIG. 3M, the recess 57 extends to a distance that is farther from the central channel axis 52M than a distance between the central channel axis 52M and the channel-defining surface 56M, and the recess 57M is therefore recessed relative to the channel-defining surface 56M. Further, in the illustrated embodiment of FIG. 3M, following a straight line in the inlet flow direction 24M from the inlet 20M leads generally to the recess 57M, so the recess 57M is positioned generally along the inlet flow direction 24M from the inlet 20M. Again, the illustrated embodiment of FIG. 3M is an example only, and alternative embodiments may include one or more recesses that may differ from the recess 57M and that may be positioned differently from the recess 57M.

In other respects, fluid flow conduit 50M of FIG. 3M may share characteristics of the fluid flow conduit 50 shown in FIGS. 1 and 2 (or of one or more other fluid flow conduits such as those described herein, for example).

As another example, FIG. 3N schematically depicts a transverse cross-section of a fluid flow conduit 50N according to a particular embodiment, where fluid flow conduit 50N comprises an inlet 20N and an outlet 22N, which may be on a side of fluid flow conduit 50N. The inlet 20N extends along an inlet axis 21 and includes a baffle 23, and as a result, the inlet 20N is configured to direct fluid into an interior of conduit 50N in an inlet flow direction 24N (i.e. such that an average velocity of the fluid directed into an interior flow region (including a flow-shaping bore or region and a principal flow channel) of the conduit 50N from inlet 20N is oriented in inlet flow direction 24N) that is non-parallel to the inlet axis 21. Again, the inlet flow direction 24N is not oriented in longitudinal direction 16N, is non-parallel to the longitudinal direction 16N, and is not orthogonal to longitudinal direction 16N. The illustrated embodiment of FIG. 3N is an example only, and alternative embodiments may have different inlet flow modifying elements, such as more than one baffle for example, and/or different inlet flow directions.

In the illustrated embodiment of FIG. 3N, a flow-shaping cross-section satisfies a flow-shaping condition such as one or more of the flow shaping conditions as described above. As a result, the fluid flow conduit 50N in the illustrated embodiment of FIG. 3M defines a recess 57N that faces the inlet 20N and that is positioned generally along the inlet flow direction 24N from the inlet 20N. Again, the illustrated embodiment of FIG. 3N is an example only, and alternative embodiments may include one or more recesses that may differ from the recess 57N and that may be positioned differently from the recess 57N.

In other respects, fluid flow conduit 50N of FIG. 3N may share characteristics of the fluid flow conduit 50 shown in FIGS. 1 and 2 (or of one or more other fluid flow conduits such as those described herein, for example).

The illustrated embodiments of FIGS. 3M and 3N are examples in which inlet flow directions are not orthogonal to longitudinal directions and inlet-projection directions are not the same as the inlet flow directions. In general, in embodiments such as those described herein, an inlet flow direction (such as the inlet flow direction 24M or 24N) may comprise a first component in the inlet-projection direction (such as the inlet-projection direction 66M) and a second component in the longitudinal direction (such as the longitudinal direction 16M) and a ratio of an amplitude of the first component to an amplitude of the second component may be greater than or equal to 1:1. In some embodiments, this ratio is greater than or equal to $\sqrt{3}$:1. In some embodiments, this ratio is greater than or equal to 3.73:1.

Figure 4:
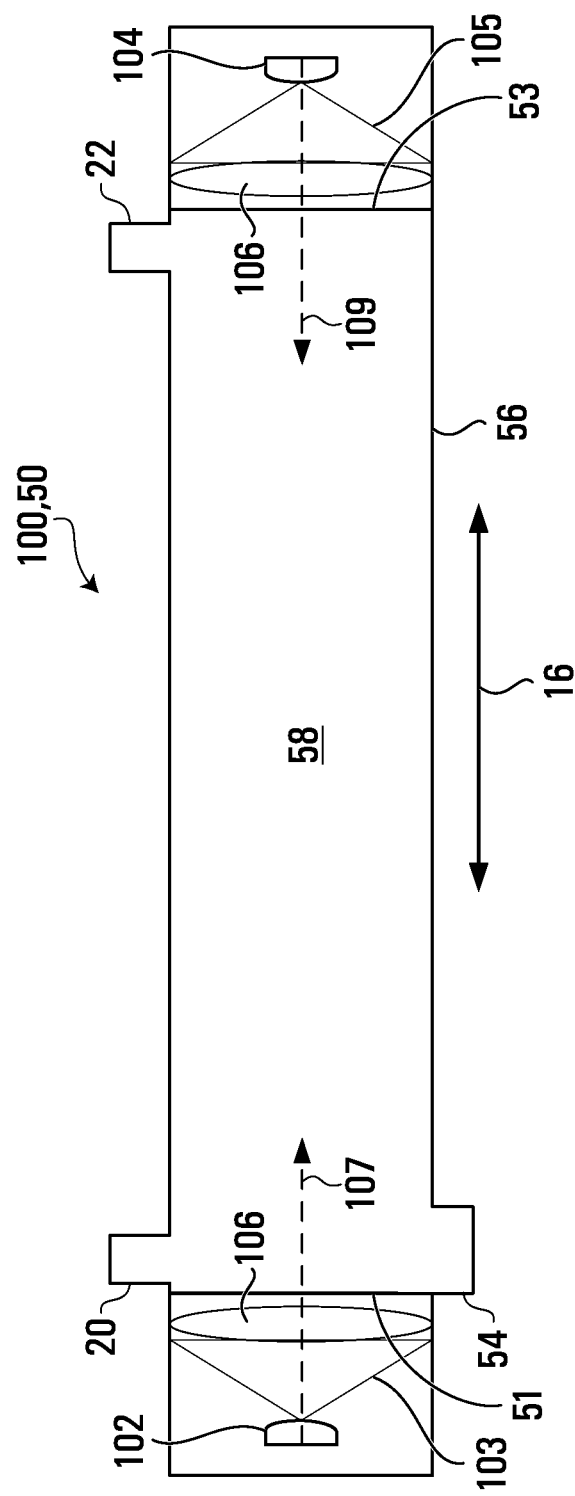
FIG. 4 illustrates a cross-section of a photo-reactor including the fluid flow conduit similar to that of FIG. 1A according to one embodiment.

In some embodiments, fluid flow conduits such as those described herein may be part of a chemical or biochemical reactor. In some embodiments, fluid flow conduits such as those described herein may be part of a photo-reactor. FIG. 4 schematically illustrates a photo-reactor 100 comprising fluid flow conduit 50 according to a particular embodiment. However, photo-reactors according to other embodiments may include other fluid flow conduits such as other fluid flow conduits as described herein, for example.

The reactor 100 may comprise one or more electromagnetic radiation emitters (such as electromagnetic radiation emitters 102, 104, each of which may be a visible light source, a UV radiation source such as a UV-LED, a different electromagnetic radiation emitter, or a combination of two or more thereof, for example) positioned at one of the longitudinal ends 51, 53 of fluid flow conduit 50 for directing light or other electromagnetic radiation 103, 105 from the electromagnetic radiation emitter to impinge on fluid that may flow in the principal flow channel 58. The reactor may comprise one or more radiation-focusing elements (e.g. lens 106) positioned in a radiation path of radiation 103, 105 emitted from one or more of the electromagnetic radiation emitter 102, 104 for directing radiation from the electromagnetic radiation emitter 102, 104 to impinge on the fluid flowing in the principal flow channel 58. The radiation from the electromagnetic radiation emitter 102, 104 may have a principal radiation emission axis 107, 109 and may be directed such that the principal radiation emission axis 107, 109 extends in the longitudinal direction 16 when the radiation impinges on the fluid flowing in the principal flow channel 58.

The illustrated embodiment of FIG. 4 includes two electromagnetic radiation emitters 102, 104. However, alternative embodiments may include one or more different light sources or other electromagnetic radiation emitters. For example, FIGS. 5A and 5B schematically illustrate a photo-reactor 110 comprising fluid flow conduit 50 according to a particular embodiment. However, photo-reactors according to other embodiments may include other fluid flow conduits such as other fluid flow conduits as described herein, for example.

FIGS. 5A and 5B illustrate seven electromagnetic radiation emitters 102A-102G at the longitudinal end 51 of fluid flow conduit 50, and FIG. 5A also illustrates additional electromagnetic radiation emitters at the longitudinal end 53 of fluid flow conduit 50. In general, photo-reactors according to different embodiments may include zero, one, or more than one electromagnetic radiation emitter at one longitudinal end and zero, one, or more than one electromagnetic radiation emitter at the other longitudinal end. Further, FIG. 5B illustrates one possible arrangement of seven electromagnetic radiation emitters 102A-102G, but alternative embodiments may include more or fewer electromagnetic radiation emitters in arrangements that may differ from the arrangement of FIG. 5B.

Each of the electromagnetic radiation emitters may be a visible light source, a UV-LED, a different electromagnetic radiation emitter, or a combination of two or more thereof, for example. Further, each of the electromagnetic radiation emitters 102A-102G may be associated with a respective lens (for example, lenses 106A, 106D, and 106G are shown in FIG. 5A) for directing radiation from the electromagnetic radiation emitter to impinge on fluid flowing in the principal flow channel 58.

The radiation from the electromagnetic radiation emitters may have principal radiation emission axes as shown in FIG. 5A that may be directed such that the principal radiation emission axes extend in the longitudinal direction 16 when the radiation impinges on the fluid flowing in the principal flow channel 58.

As indicated above, it can be desirable to provide inlet 20 and/or outlet 22 on a side of fluid flow conduit 50. In general, when an inlet is provided on a side of a fluid flow conduit or when an inlet flow direction is otherwise non-parallel with a longitudinal direction of the fluid flow conduit, a non-uniform fluid velocity profile may be created. A highly non-uniform fluid velocity profile can be undesirable in a photo-reactor because a highly non-uniform velocity profile may coincide with a highly non-uniform residency time of fluid in the photo-reactor and correspondingly non-uniform dose delivery to the fluid being treated. However, embodiments such as those described herein may provide a more-uniform fluid velocity profile (and therefore a more-uniform residence time) of fluid in fluid flow conduits when compared to other fluid flow conduits.

Figure 6:
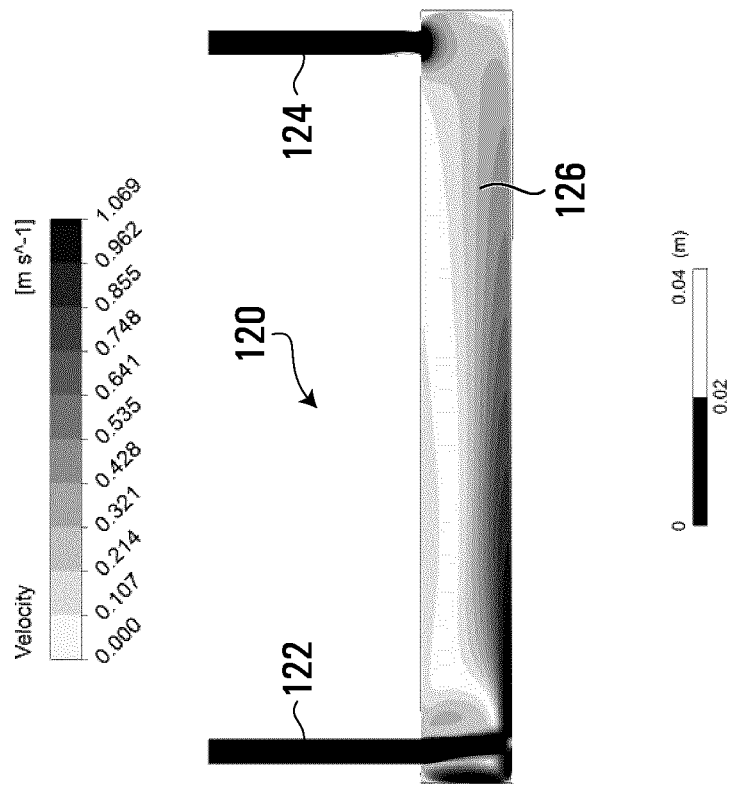
FIG. 6 shows a simulated velocity profile of fluid flow through the fluid flow conduit of FIG. 1A.

For example, FIG. 6 shows a simulated velocity profile of fluid flow through the fluid flow conduit 50 of the illustrated embodiment shown in FIGS. 1 and 2. In FIG. 6, relatively darker shading indicates relatively faster simulated fluid flow, and relatively lighter shading indicates relatively slower simulated fluid flow. It can be seen from FIG. 6 that the simulated velocity of fluid entering conduit 50 from inlet 20 is relatively high but is dissipated by flow-shaping element 54 and is relatively uniform throughout much of the flow channel 58.

Figure 7:
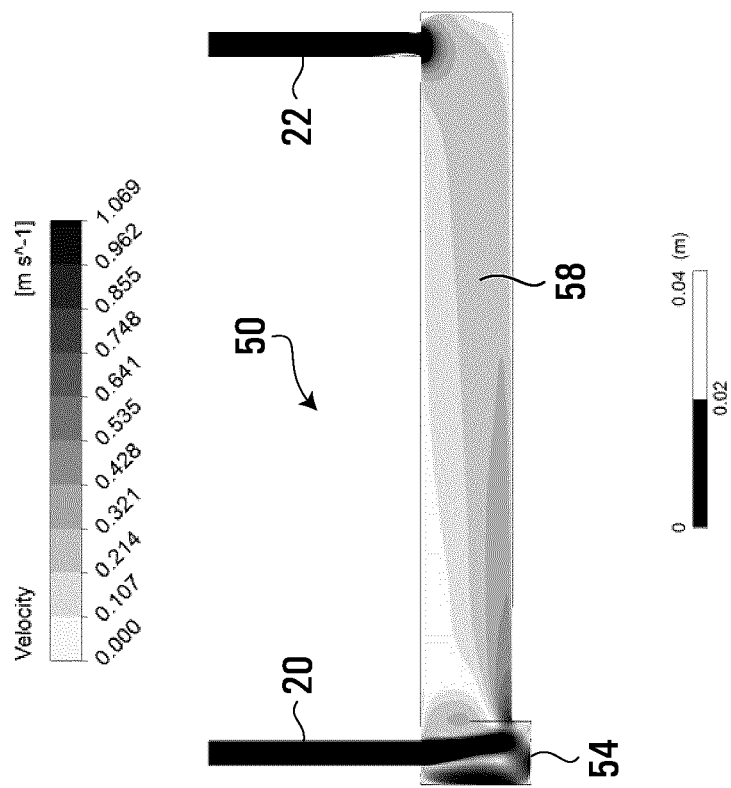
FIG. 7 shows a simulated velocity profile of fluid flow through a comparative fluid flow conduit.

For comparison, FIG. 7 shows a simulated velocity profile of fluid flow through a comparative fluid flow conduit 120 that includes a fluid inlet 122, a fluid outlet 124, and a longitudinally extending fluid flow channel 126 located between the fluid inlet 122 and the fluid outlet 124, the fluid flow channel 126 extending in a longitudinal direction for permitting a flow of fluid in the longitudinal direction, but does not include a recess (such as the recess 55 or any other recess as described herein). Access to the comparative fluid flow conduit 120 from one or both of the both longitudinal ends may be limited, so the fluid inlet 122 and the fluid outlet 124 may be on a side of the comparative fluid flow conduit 120, and fluid may have to enter and exit the comparative fluid flow conduit 120 in a transverse or radial direction.

Again, in FIG. 7, relatively darker shading indicates relatively faster simulated fluid flow, and relatively lighter shading indicates relatively slower simulated fluid flow. It can be seen from FIG. 7 that, because the fluid inlet 122 and the fluid outlet 124 are on a side of the comparative fluid flow conduit 120 and fluid enters and exits the comparative fluid flow conduit 120 in a transverse direction, the simulated velocity of fluid entering the fluid flow conduit from the inlet is high and the simulated velocities extending along the fluid flow conduit at locations opposing the side of inlet (e.g. along the lower side of the fluid flow conduit in the FIG. 7 view) are also relatively high, whereas the simulated velocities extending along locations on the same side of fluid flow conduit as the inlet (e.g. along the upper side of the fluid flow conduit in the FIG. 7 view) are relatively low. Comparing FIG. 6 with FIG. 7, it can be seen that the simulated fluid velocity in flow channel 58 (FIG. 6) is relatively more uniform than in the fluid flow conduit of FIG. 7. This is due to flow-shaping element 54, which shapes the fluid velocity to be relatively more uniform in flow channel 58.

Figure 9:
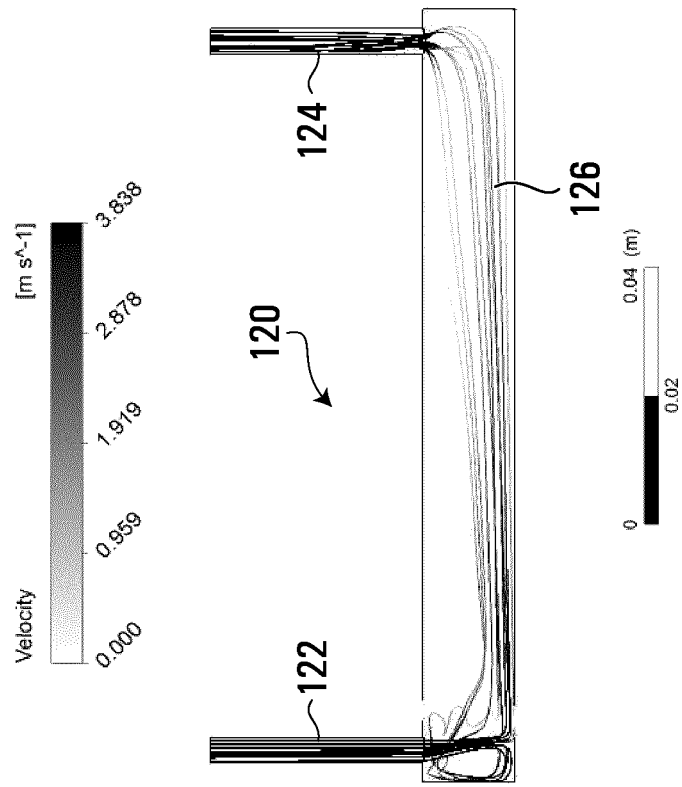
FIG. 9 shows the simulated velocity profile of FIG. 7 using path line tracing.
Figure 8:
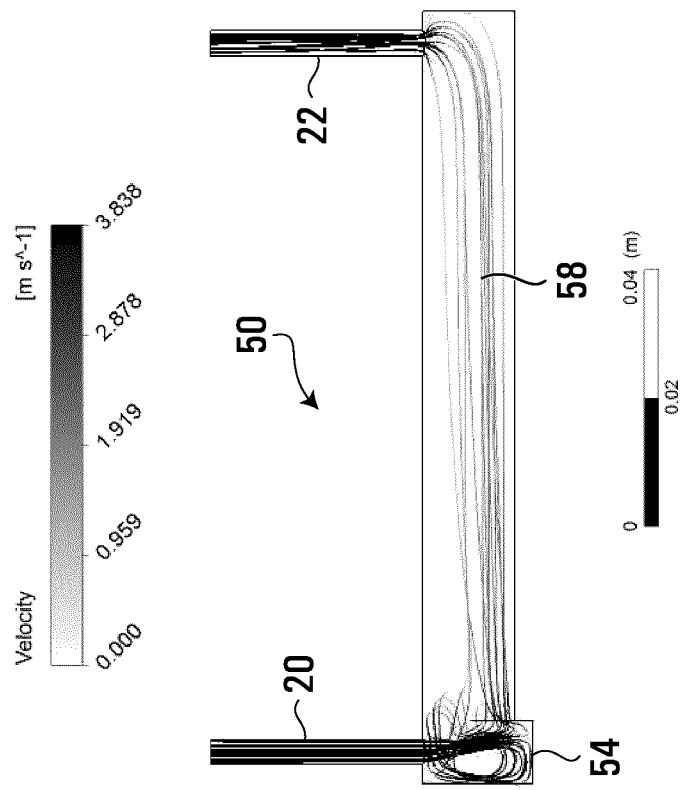
FIG. 8 shows the simulated velocity profile of FIG. 6 using path line tracing.

FIG. 8 shows the simulated velocity profile of fluid flow through the fluid conduit 50 of the illustrated embodiment shown in FIGS. 1 and 2 using another technique known as path line tracing to show "path lines" through conduit 50 between inlet 20 and outlet 22. These path lines represent the most probable paths that massless particles would take if such massless particles were released into the flow at inlet 20. FIG. 9 shows the simulated velocity profile, also using the technique known as path line tracing, of fluid flow through the comparative fluid flow conduit of FIG. 7 that does not include a recess (such as the recess 55 or any other recess as described herein). Again, in FIGS. 8 and 9, relatively darker shading indicates relatively faster simulated fluid flow, and relatively lighter shading indicates relatively slower simulated fluid flow. FIG. 9 shows that the path lines have a high density at locations opposing the side of the inlet (e.g. along the lower side of the fluid flow conduit in the FIG. 9 view) and a relatively low density on the same side of the fluid flow conduit as the inlet (e.g. along the upper side of the fluid flow conduit in the FIG. 9 view). Comparing FIGS. 8 and 9 shows that the path lines have a relatively more uniform density in FIG. 8 than in FIG. 9.

FIGS. 7 and 9 are representations showing the high degree of non-uniformity of the fluid velocity profile in a fluid flow conduit as shown that does not include a recess (such as the recess 55 or any other recess as described herein). Based on a comparison of FIGS. 6 and 8 to FIGS. 7 and 9, reactors comprising fluid flow conduits according to the embodiments described herein may have more uniform residence time of fluid in the reactor and correspondingly more uniform delivery of dose to the fluid being treated.

In general, for a particular embodiment, a person skilled in the art can choose a shape or configuration (such as a shape or configuration shown herein, or another shape or configuration) of a flow-shaping element that may be suitable for a particular embodiment. For example, in an embodiment in which a cross-sectional area of the principal flow channel is much larger than a cross-sectional area of the inlet, the average velocity of fluid in the inlet may be much higher than the average velocity of fluid in the principal flow channel. In such embodiments, a shape or configuration of a flow-shaping element as shown in FIG. 3B or 3E, for example, may cause an appropriate degree of uniformity of velocity of fluid in the principal flow channel. As another example, in an embodiment in which a cross-sectional area of the principal flow channel is closer to a cross-sectional area of the inlet, the average velocity of fluid in the inlet may be closer to the average velocity of fluid in the principal flow channel. In such embodiments, a shape or configuration of a flow-shaping element as shown in FIG. 3C or 3H, for example, may cause an appropriate degree of uniformity of velocity of fluid in the principal flow channel. A person skilled in the art can choose still other shapes or configurations of flow-shaping elements that may be suitable for particular embodiments.

Figure 10:
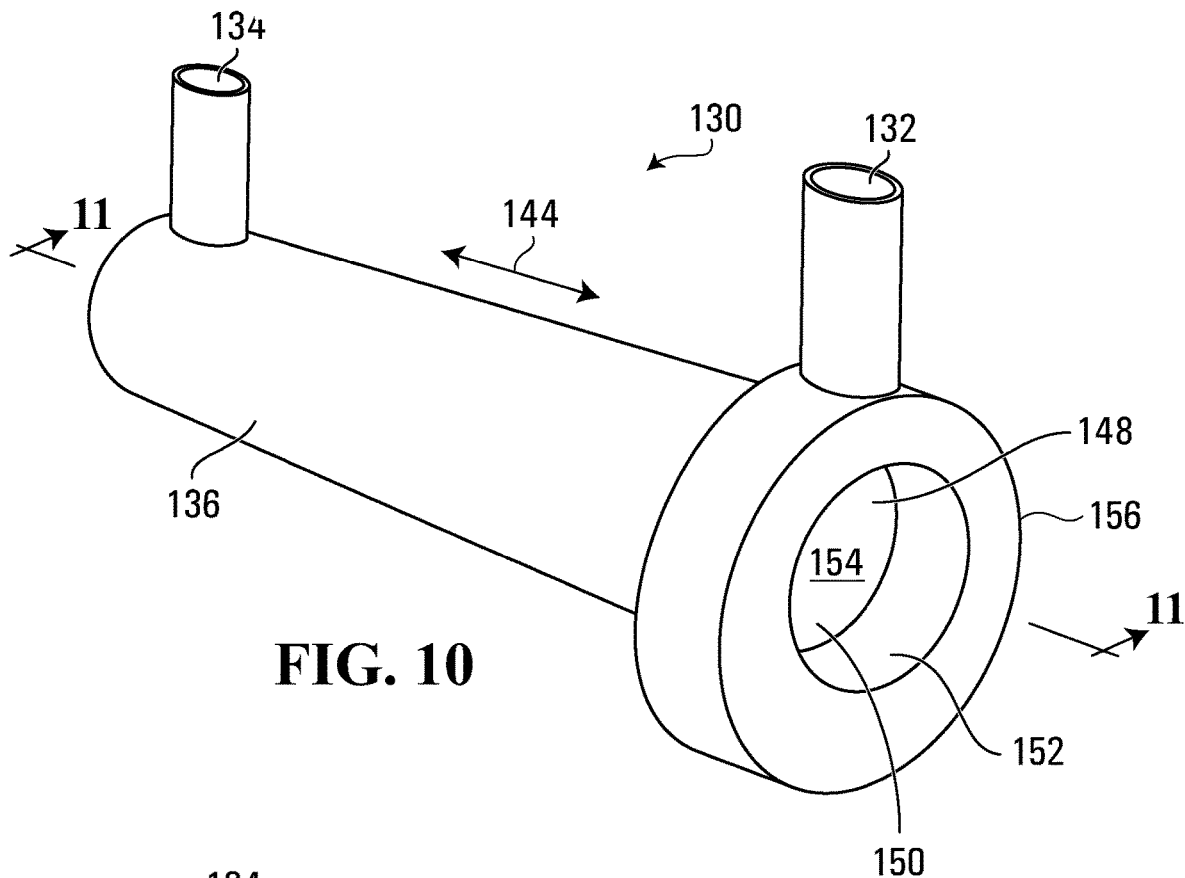
FIG. 10 is a perspective view of a fluid flow conduit according to another embodiment.
Figure 11:
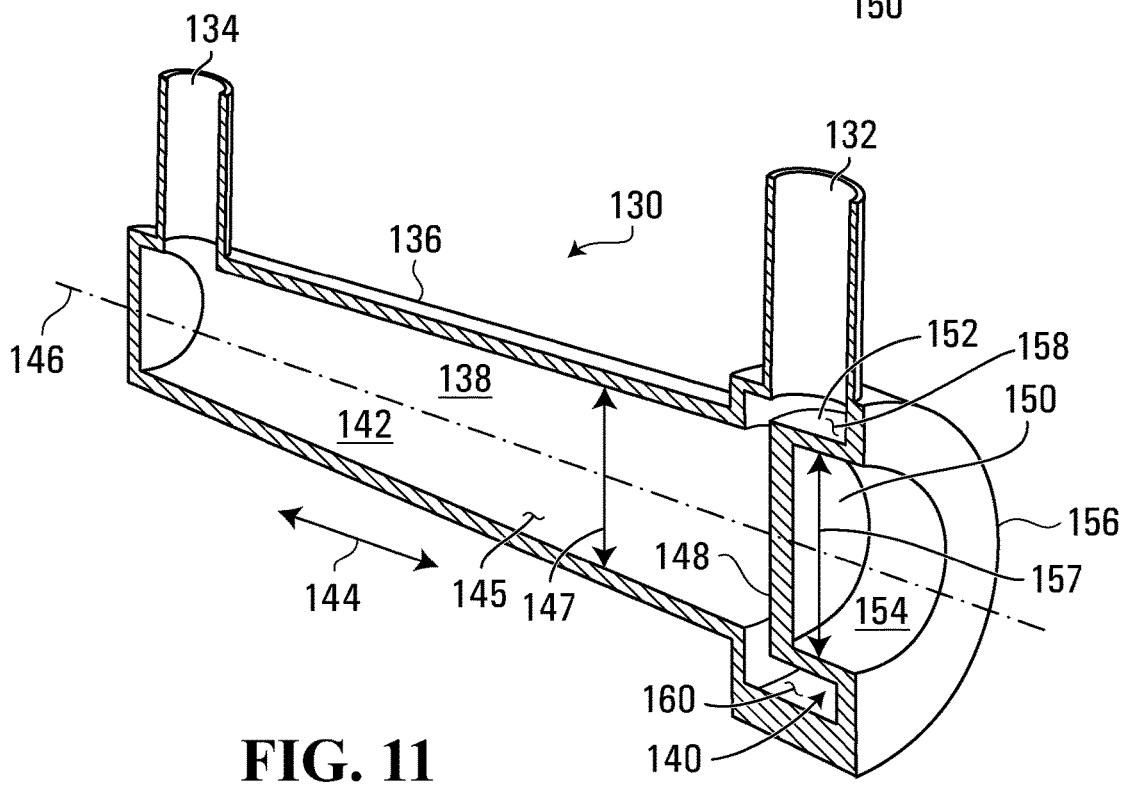
FIG. 11 is a cross-sectional view of the fluid flow conduit of FIG. 10, taken along the line 11-11 in FIG. 10.

FIGS. 10 and 11 schematically depict an embodiment of a fluid flow conduit 130 according to a particular embodiment. The fluid flow conduit 130 includes an inlet 132, an outlet 134, and a body 136 that defines an interior flow region 138. The interior flow region 138 includes a flow-shaping region 140 and a principal flow channel 142. Fluid that passes from the inlet 132 to the outlet 134 passes through at least a portion of the flow-shaping region 140 and then through at least a portion of the principal flow channel 142.

The principal flow channel 142 extends in a longitudinal direction 144, is defined by a generally cylindrical channel-defining surface 145, has a central axis 146 that also extends in the longitudinal direction 144, and has a diameter 147. Accordingly, in the embodiment shown, the principal flow channel 142 is generally cylindrical, and the central axis 146 extends through a center of the principal flow channel 142. However, alternative embodiments may differ. For example, in alternative embodiments, a transverse cross-sectional shape of the principal flow channel may change along the principal flow channel. More generally, alternative embodiments may include different principal flow channels that may not necessarily be generally cylindrical and that may have other shapes.

In the embodiment shown, the fluid flow conduit 130 includes a projection 148 projecting into the flow-shaping region 140. The projection 148 includes a generally circular wall 150 and a generally cylindrical wall 152 extending from the generally circular wall 150 and surrounding the central axis 146 of the principal flow channel 142. Surfaces of the projection 148 prevent fluid in the interior flow region 138 from entering a generally cylindrical space 154 defined in the generally cylindrical wall 152, and the generally cylindrical space 154 is open to a longitudinal end 156 of the fluid flow conduit 130. The generally cylindrical space 154 may have a diameter 157, and the diameter 157 may be generally the same as, the same as, at least as large as, or larger than the diameter 147. Further, the generally cylindrical space 154 may be centered around the central axis 146 of the principal flow channel 142. As a result, the generally cylindrical space 154 may be large enough to include an extension of the principal flow channel 142 in the longitudinal direction 144 through the flow-shaping region 140.

However, alternative embodiments may differ. For example, alternative embodiments may not include the projection 148, or may include a different projection. For example, alternative embodiments may include a projection that does not define the generally cylindrical space 154 or may include a projection that defines a different space that may have a different size or shape, that may not necessarily be cylindrical, and that may not necessarily be open to a longitudinal end. As another example, alternative embodiments may define other regions that are not necessarily a space open to a longitudinal end but that are large enough to include an extension of the principal flow channel in the longitudinal direction through the flow-shaping region.

In the embodiment shown, the generally cylindrical wall 152 has a generally cylindrical surface 158 facing outward from the generally cylindrical wall 152 and into the flow-shaping region 140, and the surface 158 surrounds the central axis 146 of the principal flow channel 142. A portion of the surface 158 faces the inlet 132 and extends between the inlet 132 and the central axis 146 of the principal flow channel. Further, an extension, along a flow direction of the inlet 132, of an entire cross-section of the inlet 132 intersects the portion of the surface 158 that faces the inlet 132. As a result, fluid that enters the interior flow region 138 from the inlet 132 first enters the flow-shaping region 140 and impinges on at least the portion of the surface 158 that faces the inlet 132 before entering the principal flow channel 142. The surface 158 may therefore function as a flow-shaping surface. However, alternative embodiments may differ. For example, alternative embodiments may include a different flow-shaping surface that may have a different size or shape and that may extend between some or all of the inlet and the central axis of the principal flow channel, and such a flow-shaping surface may not necessarily surround the central axis of the principal flow channel.

A generally cylindrical surface 160 is spaced apart from the surface 158, and at least a portion of the surface 160 faces at least a portion of the generally cylindrical surface 158. As a result, at least a portion of the flow-shaping region 140 extends between the surface 158 and the surface 160 and surrounds the central axis 146 of the principal flow channel 142. In the embodiment shown, a spacing distance between the surface 158 and the surface 160 increases with increasing distance from the inlet 132. Further, the surface 160 extends farther from the central axis 146 of the principal flow channel 142 than the channel-defining surface 145. As a result, the flow-shaping region 140 is a recess that surrounds the central axis 146 of the principal flow channel 142, and more generally, a transverse cross-sectional shape of at least a portion of the flow-shaping region 140 differs from a transverse cross-sectional shape of at least a portion of the principal flow channel 138. However, alternative embodiments may differ. For example, in alternative embodiments, at least a portion of a flow-shaping region may be generally annular or generally toroidal, or may have other shapes, and may not necessarily surround a central axis of a principal flow channel.

Figure 12:
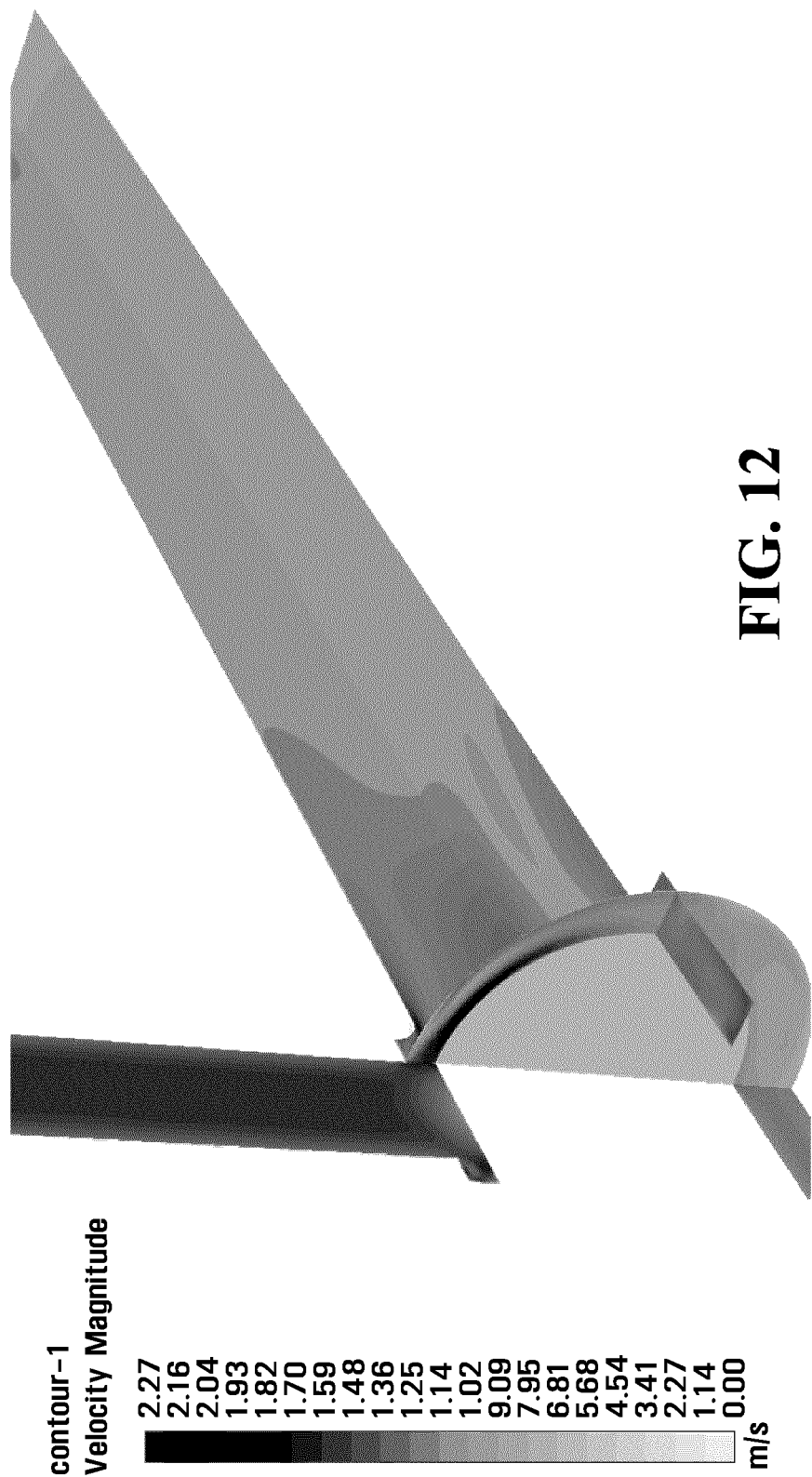
FIG. 12 is a perspective view of a first simulated velocity profile of fluid flow through the fluid flow conduit of FIG. 10.
Figure 13:
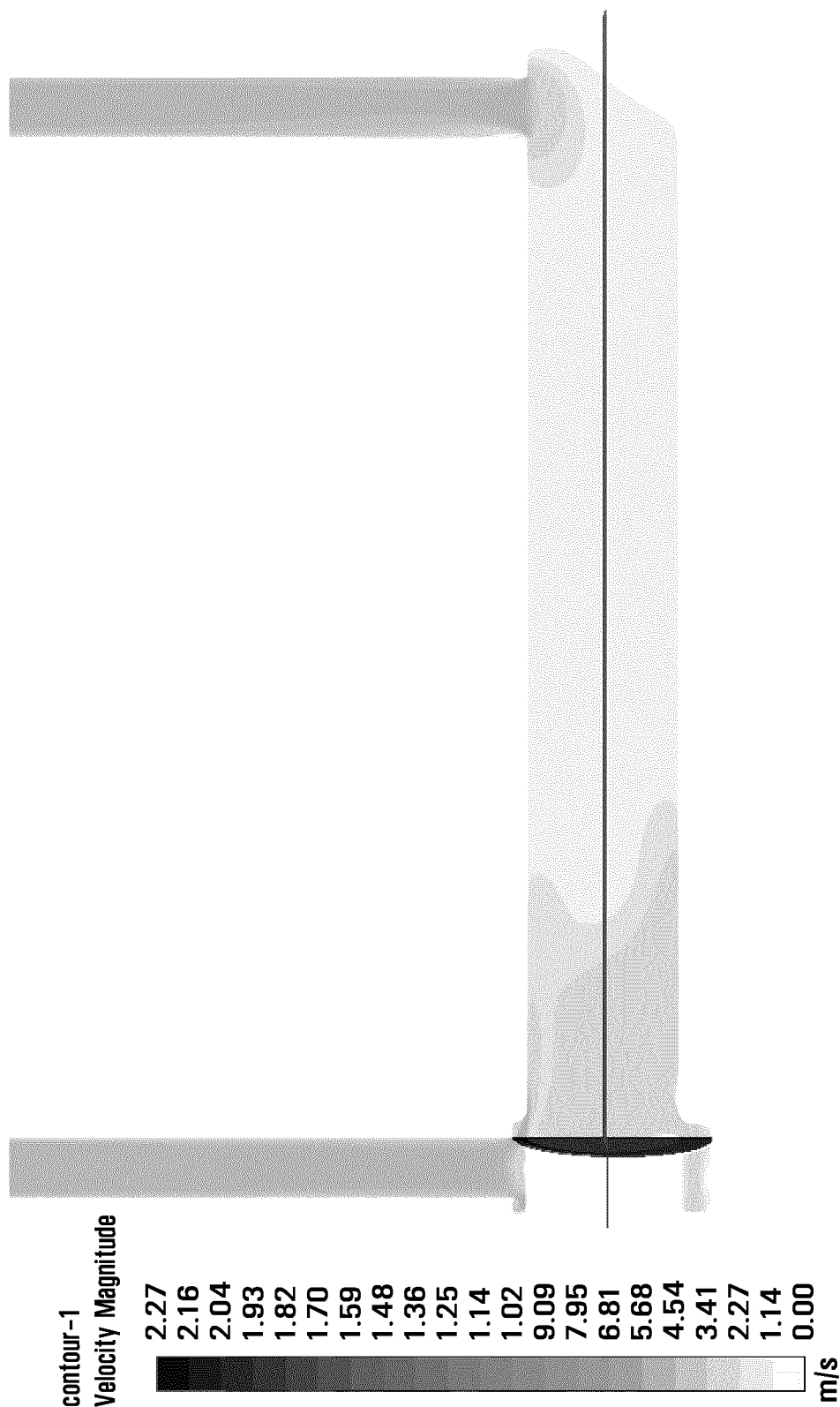
FIG. 13 is a side view of a second simulated velocity profile of fluid flow through the fluid flow conduit of FIG. 10.
Figure 14:
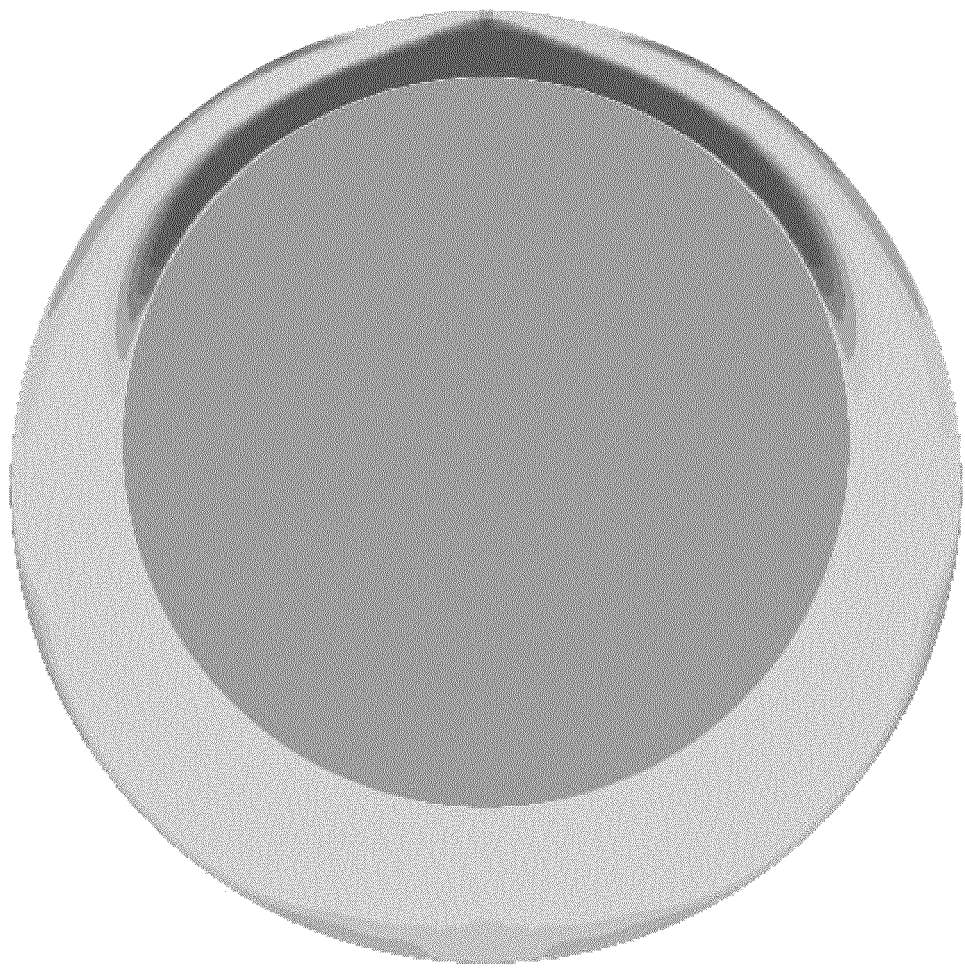
FIG. 14 is an end view of a third simulated velocity profile of fluid flow through the fluid flow conduit of FIG. 10.

FIGS. 12 to 14 illustrate different simulated velocity profiles of fluid flow through the fluid flow conduit 130. FIG. 12 shows a relatively high inlet fluid velocity, and FIG. 13 shows a relatively low inlet fluid velocity. Comparing FIGS. 12 and 13 with FIG. 7, for example, it can be seen that the simulated velocity profile of fluid flow through the principal flow channel 142 is relatively more uniform than in the fluid flow conduit of FIG. 7. This is due to the shape of the flow-shaping region 140, which shapes the fluid velocity to be relatively more uniform in the principal flow channel 142.

The generally circular wall 150 may be transparent or translucent to visible light, to UV radiation, to other electromagnetic radiation, or to two or more thereof. Therefore, one or more electromagnetic radiation emitters (as shown at 102, 104 in FIG. 4 or at 102A-102G in FIGS. 5A and 5B, for example) may be positioned at or near the longitudinal end 156 and may be positioned in or near the generally cylindrical space 154. Each such one or more electromagnetic radiation emitters may be a visible light source, a UV radiation source such as a UV-LED, a different electromagnetic radiation emitter, or a combination of two or more thereof, for example. Further, one or more radiation-focusing elements (such as one or more lenses, for example) may be positioned in a radiation path of such one or more electromagnetic radiation emitters. As a result, such one or more electromagnetic radiation emitters may direct light, UV radiation, or other electromagnetic radiation to impinge on fluid that may flow in the principal flow channel 142. Further, principal illumination axes (or, more generally, principal radiation emission axes) of such one or more electromagnetic radiation emitters can be aligned in the longitudinal direction 144 and can therefore be aligned parallel and/or antiparallel to the direction of fluid flow though the principal flow channel 142 for example, or in one or more other directions. Accordingly, the fluid flow conduit 130 may be may be part of a photo-reactor. In other embodiments, the fluid flow conduit 130 may be may be part of a chemical or biochemical reactor, for example.

As indicated above, in the embodiment shown, the generally cylindrical space 154 may be large enough to include an extension of the principal flow channel 142 in the longitudinal direction 144 through the flow-shaping region 140, or more generally, alternative embodiments may define other regions that are large enough to include an extension of the principal flow channel in the longitudinal direction through the flow-shaping region. Such spaces or regions may be so large so as to be large enough to permit visible light, UV radiation, or other electromagnetic radiation from one or more electromagnetic radiation emitters to be directed from or through such a space or region and across an entire cross-section of the principal flow channel. However, as indicated above, alternative embodiments may differ and may omit such spaces or regions or may define different spaces or regions.

In general, fluid flow conduits such as those described herein may include an inlet, a flow-shaping region, a principal flow channel, and an outlet. In some embodiments, a transverse cross-sectional shape of at least a portion of the flow-shaping region may differ from a transverse cross-sectional shape of at least a portion of the principal flow channel. For example, in some embodiments, at least a portion of the flow-shaping region may extend farther from a central axis of the principal flow channel than at least a portion of a channel-defining surface that defines the principal flow channel. As a result, such embodiments may include a recess or a flow-shaping element that may have a different transverse cross-sectional shape than the principal flow channel and that may thereby provide a range of different fluid flow velocity patterns without occupying the interior flow region or the principal flow channel. As another example, some embodiments may include a flow-shaping surface, and at least a portion of the flow-shaping surface may extend between the inlet and the central axis of the principal flow channel. A recess, a flow-shaping element, or a flow-shaping surface as described herein may provide a relatively uniform velocity distribution in the majority of the principal flow channel cross-section, and may therefore provide a relatively uniform residence time for the majority of fluid flowing through fluid flow conduits such as those described herein. Further, a recess, a flow-shaping element, or a flow-shaping surface as described herein may not require positioning a flow-restraining element in the interior flow region, and therefore may, for example, avoid blocking a radiation path in a photo-reactor that includes a fluid flow conduit as described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A fluid flow conduit comprising:
a body comprising a channel-defining surface which defines a principal flow channel extending in a longitudinal direction, wherein the body defines an interior flow region comprising the principal flow channel;
an inlet for introducing fluid into the interior flow region, the inlet located on a side of the fluid flow conduit, the inlet shaped so that an average velocity of fluid entering the interior flow region from the inlet is oriented in an inlet flow direction non-parallel to the longitudinal direction; and
an outlet for conveying fluid out of the principal flow channel, the outlet located on the side of the fluid flow conduit, the outlet spaced apart from the inlet in the longitudinal direction such that fluid that passes from the inlet to the outlet passes through at least a portion of the principal flow channel, the outlet shaped so that an average velocity of fluid entering the outlet from the interior flow region is oriented in an outlet flow direction non-parallel to the longitudinal direction;
wherein the fluid flow conduit defines a recess in the interior flow region and facing the inlet; and
wherein at least a portion of the recess communicates with the principal flow channel at a position along the longitudinal direction between the inlet and the outlet.

2. A fluid flow conduit according to claim 1 wherein the recess is positioned generally along the inlet flow direction from the inlet.

3. A fluid flow conduit according to claim 1 wherein the recess is recessed relative to the channel-defining surface.

4. A fluid flow conduit according to claim 1 wherein the inlet flow direction is substantially orthogonal to the longitudinal direction.

5. A fluid flow conduit according to claim 1 wherein the principal flow channel has a notional channel axis which extends longitudinally through a centroid of a flow-channel cross-section of the principal flow channel.

6. A fluid flow conduit according to claim 5 wherein the recess extends to a distance that is farther from the notional channel axis than a distance between the notional channel axis and the channel-defining surface.

7. A fluid flow conduit according to claim 5 further comprising a flow-shaping element comprising a flow-shaping surface which defines a flow-shaping region in the interior flow region for conveying fluid from the inlet to the principal flow channel, wherein the flow-shaping surface defines at least a portion of the recess, and wherein a flow-shaping cross-section of the flow-shaping region satisfies a flow-shaping condition.

8. A fluid flow conduit according to claim 7 wherein the flow-shaping condition comprises that a flow-shaping distance, extending in a flow-shaping direction extending between the intersection of the channel axis with the flow-shaping cross-section and the flow-shaping surface, is greater than a principal-channel distance extending in the flow-shaping direction between the intersection of the channel axis with the flow-channel cross-section and the channel-defining surface.

9. A fluid flow conduit according to claim 7 wherein the flow-shaping condition comprises that a flow-shaping distance, extending in a flow-shaping direction extending between the intersection of the channel axis with the flow-shaping cross-section and the flow-shaping surface, is greater than a reference distance extending opposite to the flow-shaping direction and between the intersection of the channel axis with the flow-shaping cross-section and the flow-shaping surface.

10. A fluid flow conduit according to claim 8 wherein the flow-channel cross-section is located at an edge of the principal flow channel closest to the flow-shaping element.

11. A fluid flow conduit according to claim 8 wherein the flow-shaping direction is an inlet-projection direction that coincides with a projection of the inlet flow direction onto the flow-shaping cross-section.

12. A fluid flow conduit according to claim 8 wherein the flow-shaping direction extends between the intersection of the channel axis with the flow-shaping cross-section and a location on the flow-shaping surface where a projection of the inlet flow direction onto the flow-shaping cross-section intersects the flow-shaping surface.

13. A fluid flow conduit according to claim 8 wherein the flow-shaping condition comprises that, for the flow-shaping cross-section of the flow-shaping region, a flow-shaping dimension in any transverse direction that:
   is orthogonal to the longitudinal direction;
   extends between the intersection of the channel axis with the flow-shaping cross-section and the flow-shaping surface; and
   is angularly spaced apart from the flow-shaping direction;
   is less than the flow-shaping distance.

14. A fluid flow conduit according to claim 8 wherein the flow-shaping condition comprises that, for the flow-shaping cross-section of the flow-shaping region, a flow-shaping dimension in any transverse direction that:
   is orthogonal to the longitudinal direction;
   extends between the intersection of the channel axis with the flow-shaping cross-section and the flow-shaping surface; and
   is angularly spaced apart from the flow-shaping direction by less than or equal to 90°;
   is equal to the flow-shaping distance.

15. A fluid flow conduit according to claim 8 wherein the flow-shaping cross-section extending +/−90° from the flow-shaping direction comprises a portion of a circle, an ellipse, a pie, a square, a rectangle, a triangle, a trapezoid, or a hexagon.

16. A fluid flow conduit according to claim 8 wherein the flow-shaping condition comprises that, for the flow-shaping cross-section of the flow-shaping region, a flow-shaping dimension in any transverse direction that:
   is orthogonal to the longitudinal direction;
   extends between the intersection of the channel axis with the flow-shaping cross-section and the flow-shaping surface; and
   is angularly spaced apart from the flow-shaping direction by less than or equal to a threshold angle;
   is greater than the flow-shaping distance.

17. A fluid flow conduit according to claim 8 wherein the flow-shaping distance is relatively large for at least some cross-sections longitudinally spaced apart from the principal flow channel and relatively small for at least some cross-sections located relatively closer to the principal flow channel in the longitudinal direction.

18. A fluid flow conduit according to claim 6 further comprising a flow-shaping surface which defines a flow-shaping region in the interior flow region for conveying fluid from the inlet to the principal flow channel, wherein at least a portion of the flow-shaping surface extends between the inlet and the notional channel axis.

19. A fluid flow conduit according to claim 18 wherein the flow-shaping surface and the flow-shaping region surround the notional channel axis.

20. A fluid flow conduit according to claim 18 wherein the recess surrounds the notional channel axis.

21. A fluid flow conduit according to claim 1 wherein the inlet extends along an inlet axis and comprises at least one inlet flow modifying element that causes the inlet flow direction to be non-parallel to the inlet axis.

22. A fluid flow conduit according to claim 1 wherein the fluid flow conduit is part of a chemical or biochemical reactor.

23. A fluid flow conduit according to claim 1 wherein the fluid flow conduit is part of a photo-reactor.

24. A fluid flow conduit according to claim 23 wherein the photo-reactor comprises at least one UV-LED positioned to direct radiation into at least the principal flow channel.

25. A fluid flow conduit according to claim 24 wherein the at least one UV-LED each has a principal radiation emission axis extending the longitudinal direction.

26. A fluid flow conduit according to claim 1 wherein the fluid flow conduit is part of a reactor for irradiating a flow of fluid with electromagnetic radiation, the reactor comprising an electromagnetic radiation emitter positioned for directing radiation from the electromagnetic radiation emitter to impinge on fluid flowing in at least the principal flow channel.

27. A UV-photo reactor comprising:
   a fluid flow conduit according to claim 1; and
   at least one UV-LED located at a longitudinal end of the fluid flow conduit for directing radiation into at least the principal flow channel.

28. A UV-photo reactor according to claim 27 wherein the at least one UV-LED each has a principal radiation emission axis extending in the longitudinal direction.

* * * * *